United States Patent [19]

Koenck et al.

[11] Patent Number: 5,410,141
[45] Date of Patent: Apr. 25, 1995

[54] HAND-HELD DATA CAPTURE SYSTEM WITH INTERCHANGABLE MODULES

[75] Inventors: Steven E. Koenck; Phillip Miller, both of Cedar Rapids; Arvin D. Danielson, Solon; Ronald L. Mahany, Cedar Rapids; Dennis A. Durbin, Cedar Rapids; Keith K. Cargin, Cedar Rapids; George E. Hanson, Cedar Rapids; Darald R. Schultz, Cedar Rapids; Robert G. Geers, Cedar Rapids; Darrell L. Boatwright, Cedar Rapids; William T. Gibbs, Cedar Rapids; Stephen J. Kelly, Marion, all of Iowa

[73] Assignee: Norand, Cedar Rapids, Iowa

[21] Appl. No.: 777,393

[22] PCT Filed: Jun. 7, 1990

[86] PCT No.: PCT/US90/03282

§ 371 Date: Jan. 7, 1992

§ 102(e) Date: Jan. 7, 1992

Related U.S. Application Data

[63] Continuation-in-part of Ser. No. 364,902, Jun. 8, 1989, abandoned, and a continuation-in-part of Ser. No. 364,594, Jun. 7, 1989, abandoned.

[51] Int. Cl.$^6$ .............................................. G06K 7/10
[52] U.S. Cl. ..................................... 235/472; 361/683; 361/729; 361/731; 361/814; 364/708.1; 364/709.10; 455/90; 455/348
[58] Field of Search ........... 364/708.1, 709.09, 709.10, 364/709.11; 361/392, 393, 394, 422; 455/90, 347, 348, 351; 235/472, 467, 470

[56] References Cited

U.S. PATENT DOCUMENTS

| D. 229,234 | 1/1979 | Kajita | D14/100 |
|---|---|---|---|
| D. 230,859 | 3/1974 | Kurosu | D26/56 |
| D. 295,411 | 4/1988 | Cho et al. | D14/100 |
| D. 303,112 | 8/1989 | Desrochers | D14/100 |
| 3,665,164 | 5/1972 | Beveridge | 235/460 |
| 3,826,900 | 7/1977 | Moellering | 250/568 |

(List continued on next page.)

FOREIGN PATENT DOCUMENTS 0194115 9/1986 European Pat. Off. .
0262943 4/1988 European Pat. Off. .

(List continued on next page.)

OTHER PUBLICATIONS

*HP-41CV Owner's Handbook and Programming Guide,* Apr. 1982 (see pp. 256–257).

Primary Examiner—Joseph A. Popek
Assistant Examiner—Christopher R. Glembocki
Attorney, Agent, or Firm—McAndrews, Held; R. Lew Gable

[57] ABSTRACT

The disclosure relates to battery powered hand-held data entry terminals wherein a peripheral module may contain an automatically operating full image reader and a wireless communication unit. The reader reads at least one full line of indicia and may comprise a laser bar code scanner or a flash type image reader. Preferably the reader has uniform resolution in orthogonal directions in the field of view so that an area image can be read at any arbitrary angular orientation and re-oriented as a stored digital image to a normalized orientation before decoding. The user interface may lie in a first longitudinally extended layer and the peripheral module may lie in a second longitudinally extended adjoining layer. In normal reading disposition of the automatic reader, the user interface may be close to its normal orientation for user interaction therewith to provide for smooth transitions between reading and user interaction operations. A hand grip portion preferably underlies the user interface for comfortable support thereof during manual actuations. The peripheral module and hand grip portion may be used entirely separately from the user interface and may have a wireless link with the user interface. The user interface may comprise a digitizer/display with resolution for accurately digitizing and displaying a person's signature. Signatures may also be digitized via an optical full image reader for immediate verification.

135 Claims, 19 Drawing Sheets

5,410,141

Page 2

U.S. PATENT DOCUMENTS

| | | | |
|---|---|---|---|
| 3,947,817 | 3/1976 | Requa | 235/472 |
| 3,976,973 | 8/1976 | Martin et al. | 235/472 |
| 4,002,892 | 1/1977 | Zielinski | 307/150 |
| 4,005,400 | 1/1977 | Engdahl | 340/365 R |
| 4,017,725 | 4/1977 | Roen | 235/152 |
| 4,020,527 | 3/1977 | O'Neill | 16/110 |
| 4,091,270 | 5/1978 | Musch et al. | 235/419 |
| 4,115,870 | 9/1978 | Lowell | 364/900 |
| 4,133,034 | 1/1979 | Etter | 364/464 |
| 4,136,821 | 1/1979 | Sugiura et al. | 235/462 |
| 4,141,492 | 2/1979 | Michel et al. | 235/437 |
| 4,158,130 | 6/1979 | Speraw et al. | 235/146 |
| 4,158,194 | 1/1979 | McWaters et al. | 235/454 |
| 4,165,554 | 8/1979 | Faget | D18/7 |
| 4,188,103 | 2/1980 | Biber et al. | 354/27 |
| 4,210,802 | 7/1980 | Sakai | 235/483 |
| 4,247,908 | 1/1981 | Lockhart, Jr. et al. | 364/900 |
| 4,277,837 | 7/1981 | Stuckert | 364/900 |
| 4,282,425 | 8/1991 | Chadima et al. | 235/462 |
| 4,322,612 | 3/1982 | Lange | 235/419 |
| 4,385,285 | 5/1983 | Horst et al. | 382/3 |
| 4,415,065 | 11/1983 | Sandstedt | 186/39 |
| 4,418,277 | 11/1983 | Tremmel et al. | 235/472 |
| 4,422,745 | 12/1983 | Hopson | 354/105 |
| 4,423,319 | 12/1983 | Jacobsen | 235/419 |
| 4,460,120 | 7/1984 | Shepard et al. | 235/472 |
| 4,488,679 | 12/1984 | Bockholt et al. | 235/469 |
| 4,500,776 | 2/1985 | Laser | 235/162 |
| 4,506,344 | 3/1985 | Hubbard | 364/900 |
| 4,511,970 | 4/1985 | Okano et al. | 364/401 |
| 4,523,087 | 6/1985 | Benton | 235/379 |
| 4,523,297 | 6/1985 | Ugon et al. | 235/380 |
| 4,569,421 | 2/1986 | Sandstedt | 235/383 |
| 4,570,057 | 2/1986 | Chadima, Jr. et al. | 364/708 |
| 4,578,571 | 3/1986 | Williams | 235/472 |
| 4,603,262 | 7/1986 | Eastman et al. | 250/566 |
| 4,621,189 | 1/1986 | Kumar et al. | 235/472 |
| 4,627,736 | 12/1986 | Komaki | 368/88 |
| 4,628,193 | 12/1986 | Blum | 235/375 |
| 4,634,845 | 1/1987 | Hale et al. | 235/350 |
| 4,641,292 | 2/1987 | Tunnell et al. | 381/42 |
| 4,654,818 | 3/1987 | Wetterau, Jr. | 364/900 |
| 4,689,761 | 8/1987 | Yurchenco | 364/708 |
| 4,703,161 | 10/1987 | McLean | 235/1 |
| 4,706,096 | 11/1987 | Sato | 235/488 |
| 4,718,103 | 1/1988 | Shajima et al. | 382/13 |
| 4,718,110 | 1/1988 | Schaefer | 455/90 |
| 4,727,245 | 2/1988 | Dobbins et al. | 235/472 |
| 4,734,566 | 3/1988 | Senda et al. | 235/495 |
| 4,743,773 | 5/1988 | Katanta et al. | 250/566 |
| 4,749,353 | 6/1988 | Breedlove | 381/43 |
| 4,752,965 | 6/1988 | Dunkley | 235/379 |
| 4,758,717 | 7/1988 | Shepard et al. | 235/472 |
| 4,760,248 | 7/1988 | Swartz et al. | 235/472 |
| 4,766,300 | 8/1988 | Chadima, Jr. et al. | 235/472 |
| 4,768,230 | 9/1988 | Viebrantz et al. | 455/603 |
| 4,773,032 | 9/1988 | Uehara | 364/900 |
| 4,793,812 | 12/1989 | Sussman et al. | 235/472 |
| 4,825,057 | 4/1989 | Swartz | 235/472 |
| 4,831,275 | 5/1989 | Drucker | 235/472 |
| 4,835,372 | 5/1989 | Gombrich | 235/375 |
| 4,836,256 | 6/1989 | Meliconi | 206/523 |
| 4,842,966 | 6/1989 | Omori et al. | 307/150 |
| 4,845,350 | 7/1989 | Shepard et al. | 235/472 |
| 4,850,009 | 7/1989 | Zook et al. | 235/375 |
| 4,857,716 | 8/1989 | Gombrich et al. | 235/462 |
| 4,866,646 | 9/1989 | Nakamura et al. | 364/709.11 |
| 4,877,949 | 10/1989 | Danielson et al. | 235/462 |
| 4,881,839 | 11/1989 | Grimm | 400/692 |
| 4,890,832 | 1/1990 | Komaki | 235/146 |
| 4,897,532 | 1/1990 | Swartz et al. | 235/472 |
| 4,910,775 | 3/1990 | Yves et al. | 235/379 |
| 4,916,441 | 4/1990 | Gombrich | 235/380 X |
| 4,942,356 | 7/1990 | Ellingen et al. | 361/392 |
| 4,953,113 | 8/1990 | Chadima, Jr. et al. | 364/708 |
| 4,967,188 | 10/1990 | Collins | 340/636 |
| 4,972,496 | 11/1990 | Sklarew | 382/13 |
| 4,983,818 | 1/1991 | Knowles | 235/467 |
| 5,002,184 | 3/1991 | Lloyd | 206/305 |
| 5,012,407 | 4/1991 | Finn | 364/200 |
| 5,023,824 | 6/1991 | Chadima, Jr. et al. | 235/462 |
| 5,049,862 | 9/1991 | Dao et al. | 340/706 |
| 5,049,863 | 9/1991 | Oka | 340/710 |
| 5,057,676 | 10/1991 | Komaki | 235/375 |
| 5,059,778 | 10/1991 | Zouzoulas et al. | 235/472 |
| 5,202,817 | 4/1993 | Koenck et al. | 361/393 |
| 5,216,233 | 6/1993 | Main et al. | 235/472 |
| 5,218,187 | 6/1993 | Koenck et al. | 235/375 |
| 5,227,614 | 7/1993 | Danielson et al. | 235/380 |

FOREIGN PATENT DOCUMENTS

| | | |
|---|---|---|
| 2389938 | 1/1979 | France . |
| 58-176792 | 10/1983 | Japan . |
| 58-211261 | 12/1983 | Japan . |
| 2-144681 | 6/1990 | Japan . |
| 1572962 | 8/1980 | United Kingdom . |
| 2201125 | 8/1988 | United Kingdom . |
| 8700659 | 1/1987 | WIPO . |
| 8707106 | 11/1987 | WIPO . |

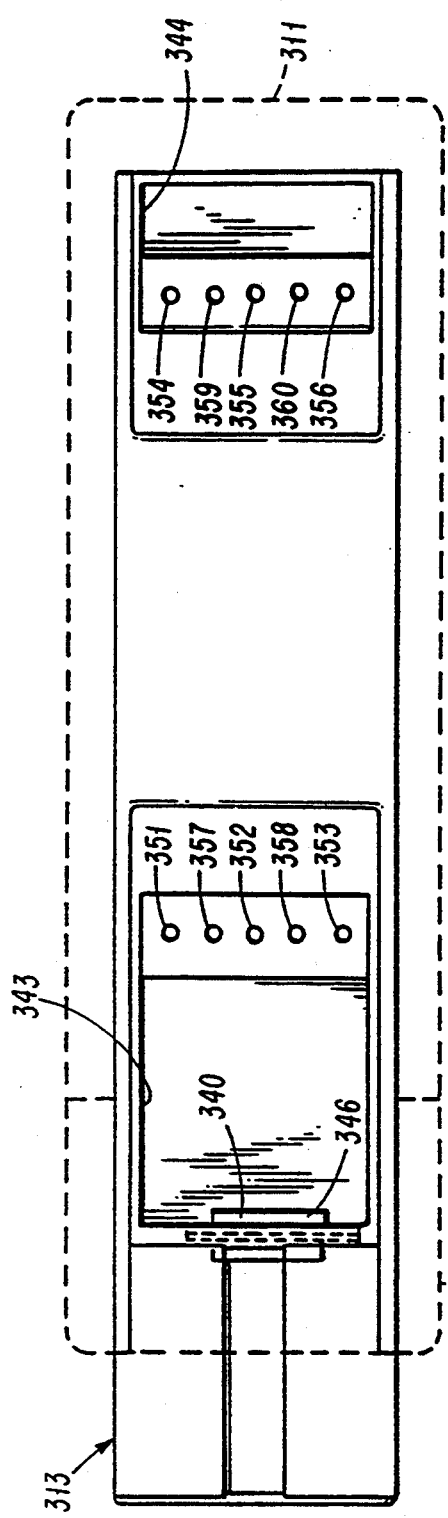
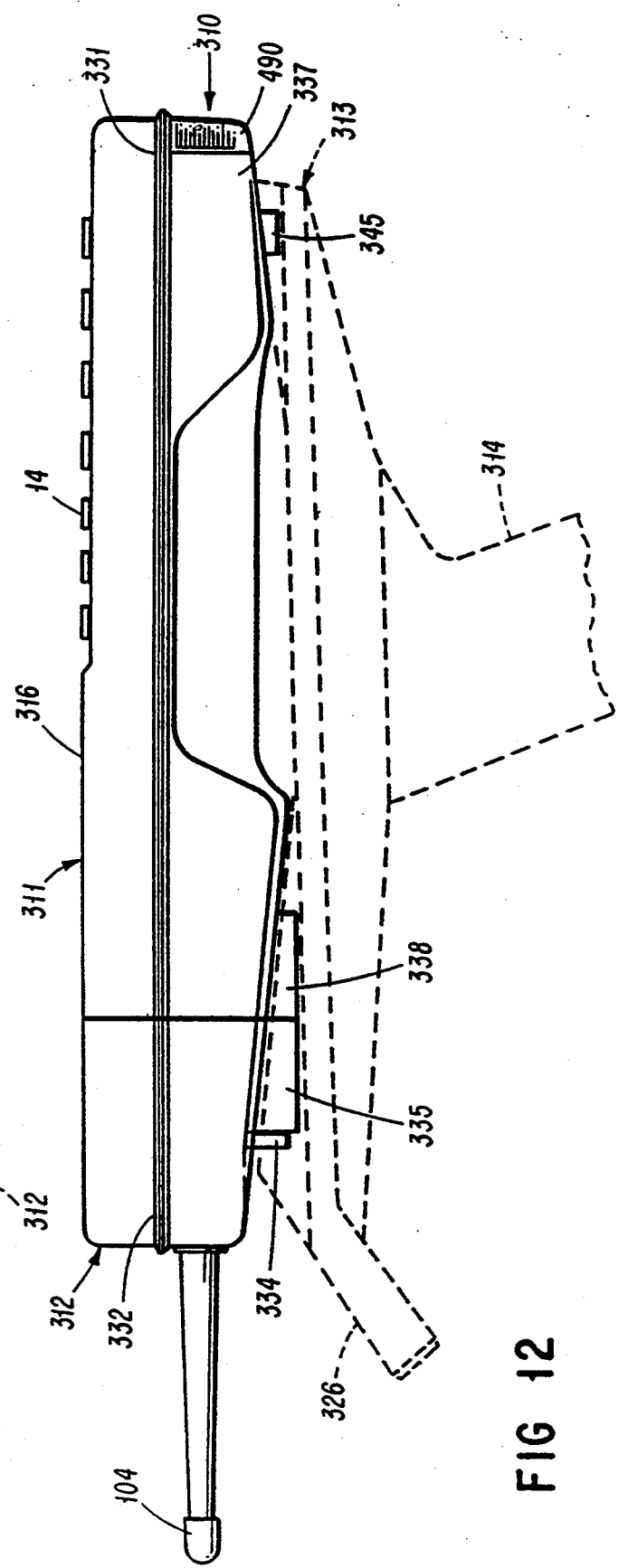
FIG 13
FIG 12

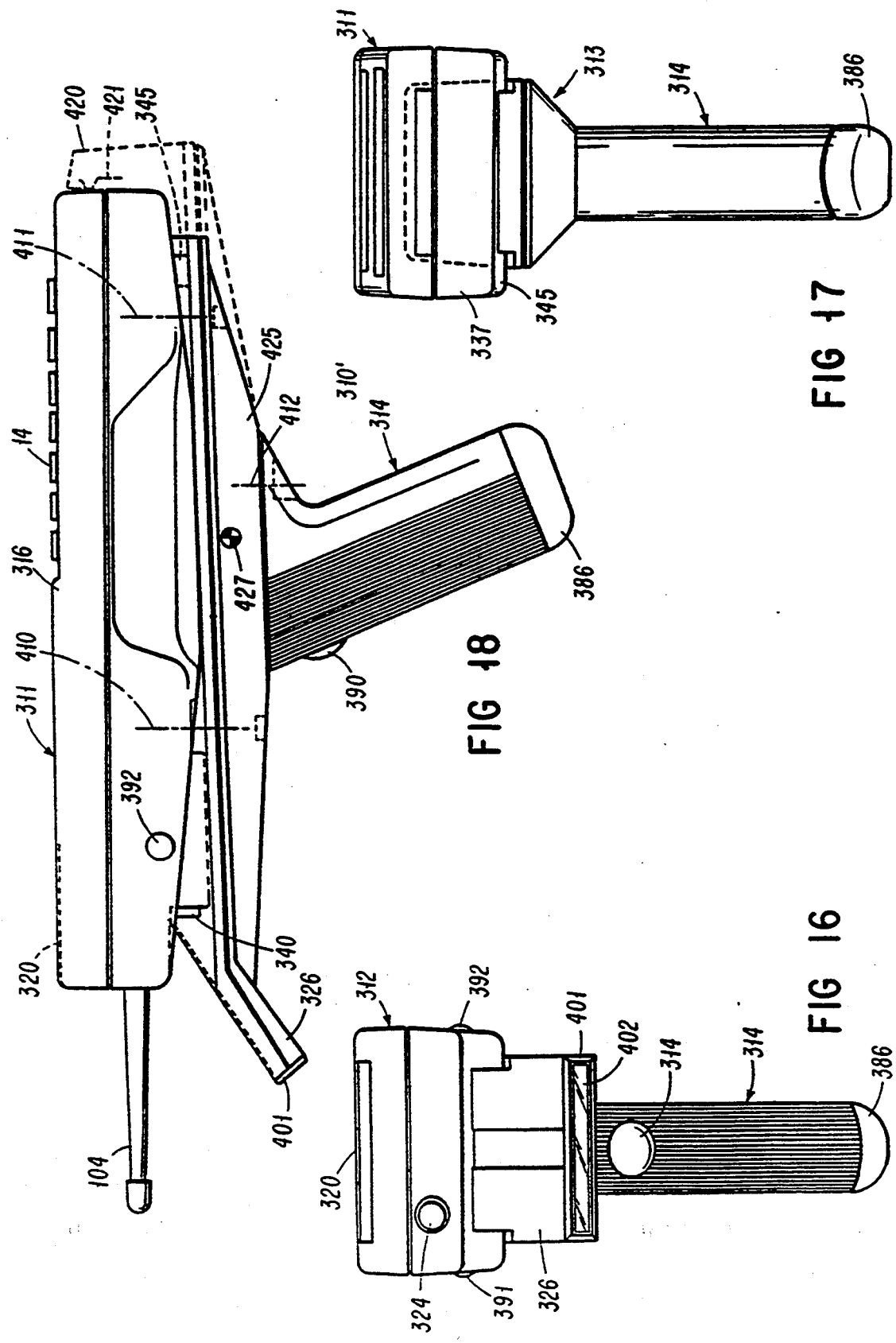

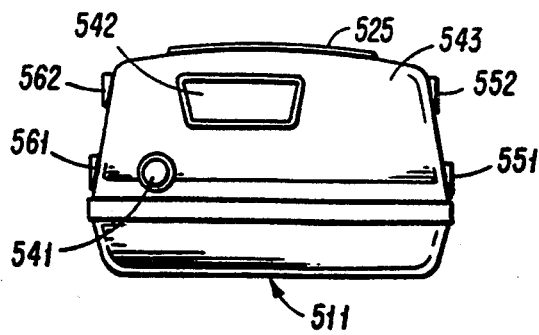
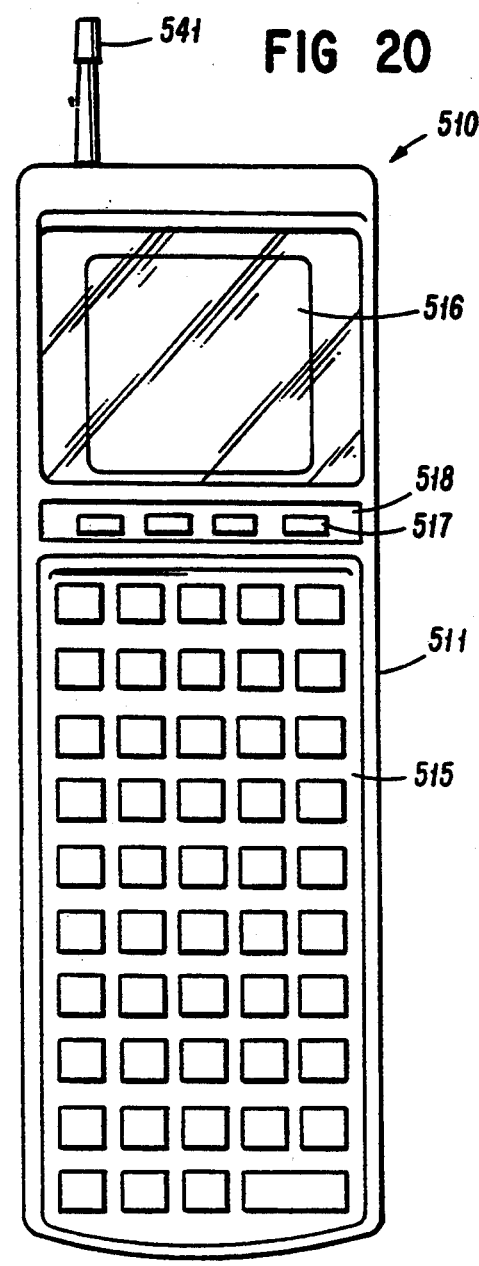
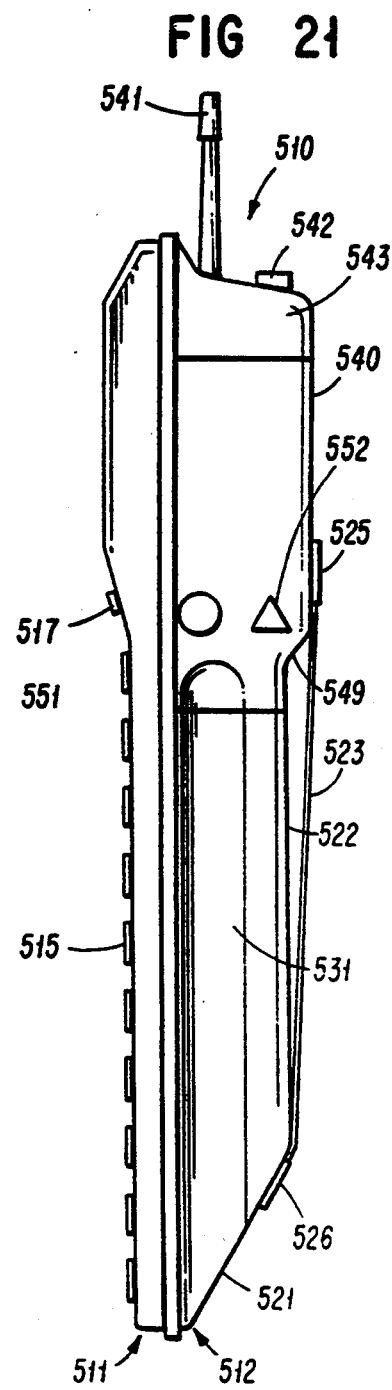

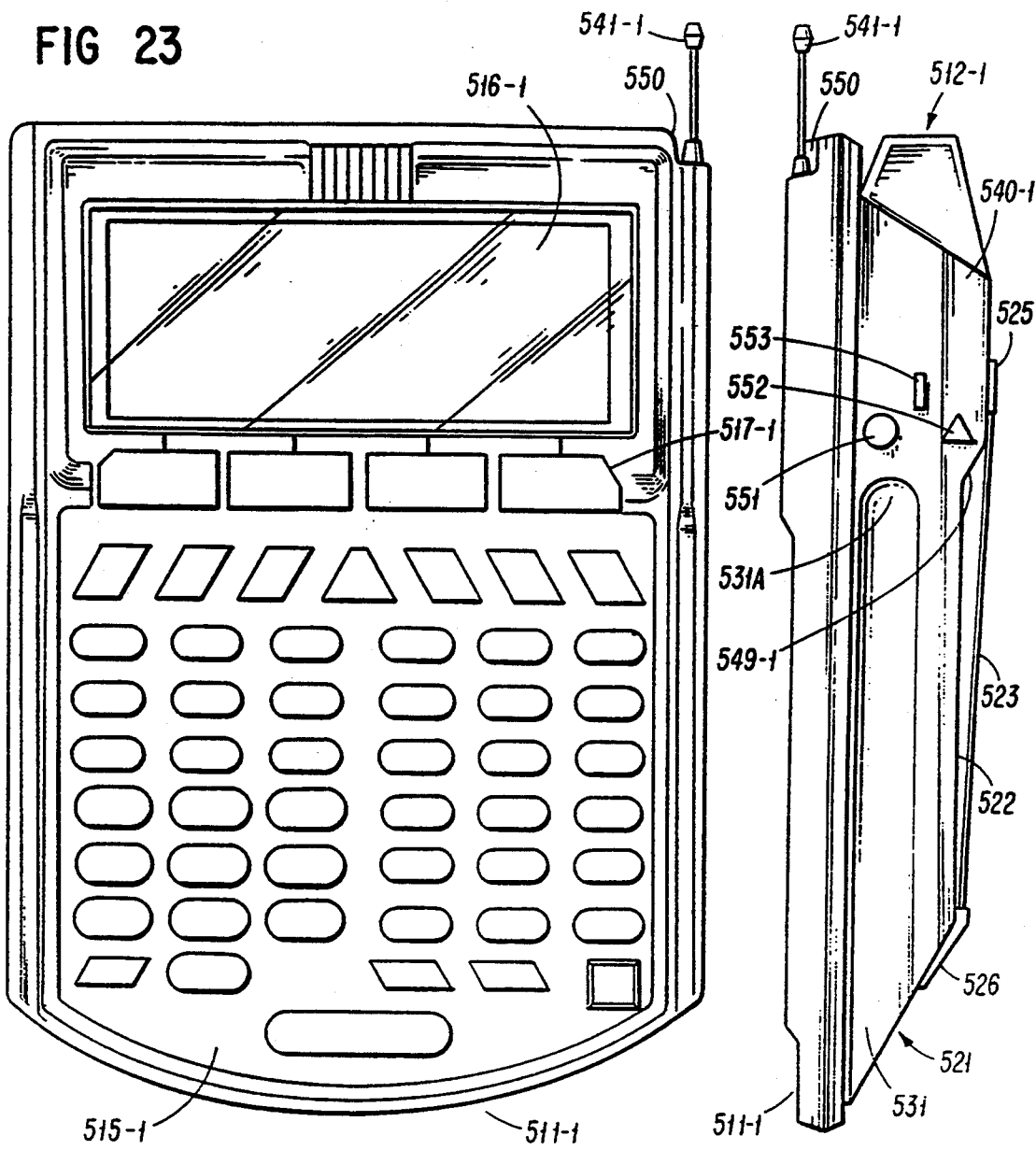
FIG 23
FIG 24
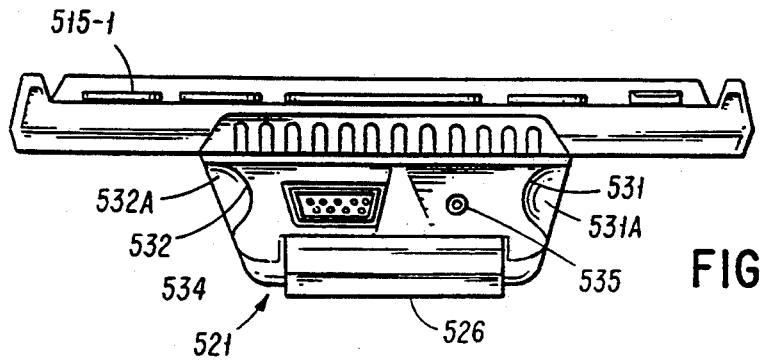
FIG 25

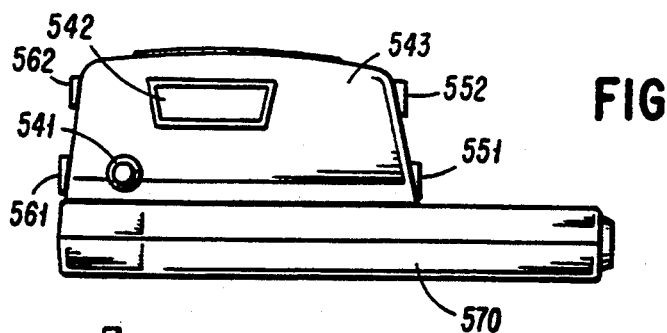
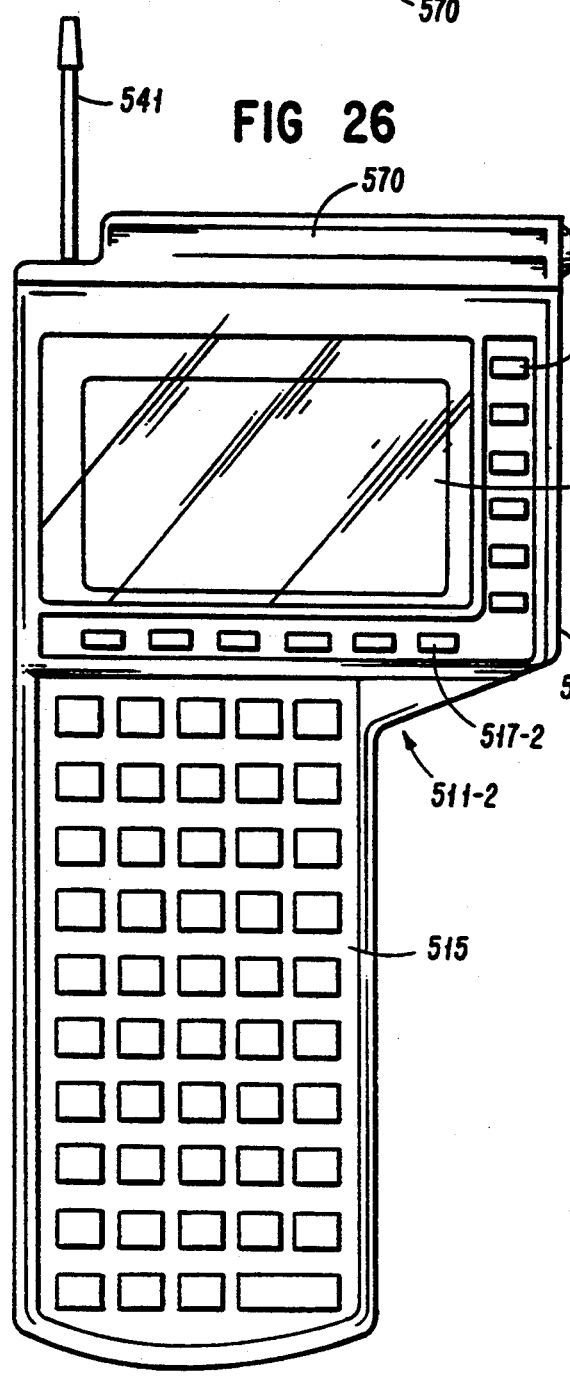
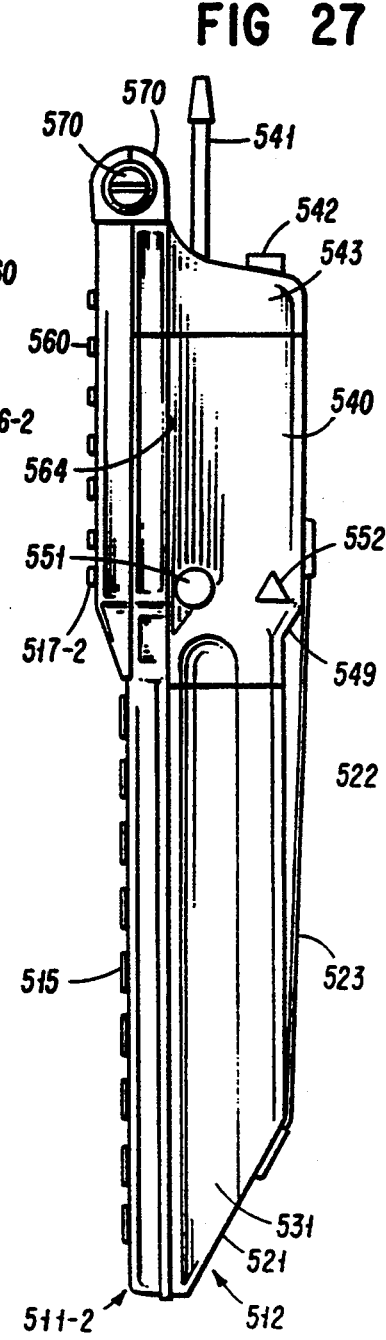

HAND-HELD DATA CAPTURE SYSTEM WITH INTERCHANGABLE MODULES

REFERENCE TO RELATED APPLICATIONS

Cross-reference is made to the following related patent applications:

(1) This application is the U.S.A. national phase of International Application No. PCT/US 90/03282, entitled "Hand-Held Data Capture System With Interchangeable Modules" with an International Filing Date of Jun. 7, 1990 in the names of Steven E. Koenck et al., and is a continuation-in-part of U.S. Ser. No. 07/364,902, entitled, (36767) "Modular Hand-Held System Capable of Bar Code Scanning and On-Line RF Transmission of Scanning Data", filed Jun. 8, 1989 in the names of Arvin D. Danielson, and Darald R. Schultz, now abandoned, and of U.S. Ser. No. 07/364,594, entitled "Hand-Held Computer Terminal" filed Jun. 7, 1989 in the names of Keith K. Cargin et al., now abandoned.

(2) U.S. Ser. No. 07/707,954, entitled "Hand-Held computerized Data Collection Terminal with Rechargeable Battery Pack Sensor and Battery Power Conservation", filed May 22, 1991 in the names of Keith K. Cargin et al., now abandoned.

(3) Ser. No. 07/339,330, entitled "Hand-Held Computer Terminal" filed Apr. 14, 1989 in the names of Keith K. Cargin et al., now abandoned.

(4) Ser. No. 07/451,322, entitled "Core Computer Processor Module, and Peripheral Shell Module Assembled to Form a Pocket Size Data Capture Unit" filed Dec. 15, 1989 in the names of Arvin A. Danielson and Dennis A. Durbin, now U.S. Pat. No. 5,227,614, which discloses earlier modular data collection terminals.

(5) Ser. No. 07/143,921, entitled "Core Computer Processor Module, and Peripheral Shell Module Assembled to Form a Pocket Size Data Capture Unit" filed Jan. 14, 1988 in the names of Arvin A. Danielson and Dennis A. Durbin, now abandoned.

(6) Ser. No. 06/897,547, entitled "Core Computer Processor Module, and Peripheral Shell Module Assembled to Form a Pocket Size Data Capture Unit" in the names of Dennis A. Durbin, Stephen J. Kelley, et al. filed Aug. 15, 1986, now abandoned.

(7) U.S. Ser. No. 07/744,813, entitled "Modular Hand-Held System Capable of Bar Code Scanning And On-line RF Transmission of Scanning Data", filed Aug. 12, 1991 in the names of Arvin D. Danielson and Darald R. Schultz, now abandoned.

BACKGROUND OF THE INVENTION

This invention generally relates to data collection systems wherein a hand-held unit is operated from battery power and functions to collect and process data by a sequence of automated and manual operations. A typical automated process is the non-contact scanning of bar code data by means of a cyclically deflected laser beam or with the use of an image photosensor of the CCD type. Once a valid bar code reading has been obtained, a keyboard may be manually operated to indicate an associated quantity. The user may then manually initiate a further operation, for example, the on-line transmission of the data to a remote host computer e.g. via a radio frequency communications link.

The presently known data capture devices which include a user interface such as a keyboard and display, and a non-contact automatic reader function have tended to be highly specialized, bulky and expensive. In a prior art device having the desired functions, it may be necessary to completely invert the device after a bar code reading, in order to view the display, and/or to actuate the keyboard.

Devices which essentially add a keyboard and display to an existing scanner design may be particularly awkward to use, for example because the keyboard and display are applied at the forward end of the scanner where they are not conveniently accessible and where manual forces applied to the keyboard are tedious to counteract with the supporting handle which is much closer to the user's body.

It would be desirable to have a basic data capture terminal which is light weight and compact, and which could be readily converted for on-line wireless communications and bar code scanning as needed. Such a versatile data capture system would be particularly suitable for small scale operations where low cost is a major objective, and versatility of the terminal unit is especially advantageous. Furthermore, in order to realize the benefits of mass production, it is desirable from the manufacturer's standpoint if a basic computerized terminal configuration can be readily adapted to the needs of diverse end users by the selective addition of low cost modules.

SUMMARY OF THE INVENTION

In accordance with an important aspect of the present invention, a light weight low cost basic terminal can be adapted for on-line RF communication with a host computer and selectively accommodate high throughput bar code scanners of the instant type such as CCD bar code scanners and deflected laser beam scanners, while essentially avoiding the deficiencies in the prior art devices.

It is highly desirable that the data capture system be compatible with existing peripheral equipment e.g. for downloading data to the terminal and where applicable recharging the terminal batteries. In a particularly advantageous embodiment a basic terminal unit has one end with external contacts compatible with existing communicating and recharging docking apparatus and an opposite end adapted to selectively receive various modular adaptor end caps. Besides a compatibility end cap providing standard overall dimensions and a standard electrical connector arrangement compatible with an existing printer docking receptacle, the terminal may be coupled with an automatic bar code scanner or other desired peripheral device. The basic terminal may receive an RF module adapting the terminal for on-line RF communications.

In accordance with preferred features, the RF module can be removed and replaced with another similar module without requiring any tuning adjustments. Further such module interchange can most preferably be carried out in the field by the end user. Because of such capability the useful life of the basic terminal may be extended without service interruptions for return to the factory or service center, and the terminal is readily upgraded and adapted to new operating requirements. For example different operating frequencies can be selected simply by replacing the RF module. This is achieved by stocking only the desired modules which are of low cost in comparison to the total system. Similarly, the laser scanning component may be associated with the basic terminal only as needed, the basic terminal alone being used where only this type of capability is required.

An object of the invention is to provide a basic terminal configuration of compact light weight construction but which is readily adapted to wireless data communication with other components of a data capture system such as a host computer, and which preferably retains a capability for coupling with a non-contact self scanning type bar code reader or other highly efficient data capture component.

Another object is to provide such a basic terminal configuration which can be quickly and easily associated with a wireless transceiver module without requiring special tools.

A further object of the invention resides in the provision of a basic terminal configuration with modular means for providing RF communications capability or the like. Preferably the RF module can be replaced in the field without requiring any tuning adjustment.

Still another object of the invention relates to the provision of a hand-held type data capture system wherein a basic low cost light weight terminal unit can selectively receive various modules such as an RF module, but such system retaining the option of compatibility with existing communicating and/or recharging docking receptacles (e.g. of a portable printer or the like).

In an illustrated embodiment, an RF adaptor module is electrically coupled with a control microprocessor of the basic terminal configuration. The control microprocessor may be installed on a peripheral card within the terminal, and the peripheral card in turn may have pin and socket type coupling with a host printed circuit board mounting a main computer processor. The RF adaptor module may have a standard external connector fitting and may contain electrical connector means therefor which automatically engage with mating electrical connector means on the peripheral card as the end cap module is mechanically applied to the terminal. Radio frequency and/or scanner cabling from the peripheral card may pass through a slot in the end wall of the terminal and may be manually connected with the receive/transmit circuits and/or external scanner connector of the RF module prior to fastening of the module to the terminal, or automatic coupling means may be provided for the RF and/or scanner circuits as well as for the standard external connector fitting.

In a further advantageous development, a basic terminal part is essentially of length to fit along the palm of the user's hand. A wireless communications module may be arranged in line with the basic part to form therewith a terminal module. A user interface module may overlie the terminal module and may have its undersurface mating with the terminal module. The terminal module may have a standard width so as to be comfortably embraced by the user's hand, while user interface modules of different widths may be applied thereto so that different widths of keyboard and display are readily available. Preferably a keyboard directly overlies the hand grip of the basic terminal part. Different user interface modules may provide different key arrangements and keys with greater spacing for example.

A docking unit may be configured to receive the basic terminal part while accommodating any of the various width interface modules. Advantageously the basic terminal part may have longitudinal grooves which interfit with guide ribs of the docking unit as the terminal is inserted. The grooves may facilitate secure manual gripping of the terminal during use.

The mating parts of the terminal are modular in the sense that they can be readily disconnected from each other. One interface part can be disconnected, removed as a unit, and replaced with a part of the same or different width. Similarly, the basic part or wireless part is readily disconnected from the other parts, removed as a unit, and replaced. Further in preferred form each modular part has only quick disconnect type signal coupling with the other parts, and most preferably the parts are self-guided so that the couplings are achieved as the automatic result of correct interfitting of the parts, as the parts are pressed together. In the ideal embodiment, each module has definable performance characteristics which permit it to be tested and adjusted as a separate unit. Then the various parts can be interchanged without requiring any further tuning or adjustment.

In a still further highly advantageous development, an entire terminal is of optimum size and weight so as to be comfortably contained in the hand during use. As before, the terminal is modular particularly so as to selectively receive a wireless communication module or a combined wireless communication and automatic reader module. The basic terminal parts may comprise a user interface top layer and a battery containing layer underlying approximately one half of the interface layer. The communication module or the combined communication and reader module may be selectively interfitted with the basic terminal parts to form a highly compact terminal which is particularly comfortably gripped.

Other objects, features and advantages will be apparent from the following detailed description, taken in connection with the accompanying drawings, and from the individiual features and relationships of the respective appended claims.

BRIEF DESCRIPTION OF THE DRAWINGS

FIG. 12 is a side elevational view showing a RF data terminal in solid lines, and indicating with dash lines a scanner module which is mated therewith, to form the unitary hand-held data capture device of FIG. 11.

FIG. 13 is a top plan view of the scanner module which forms part of the data capture device of FIG. 11.

FIG. 16 is a front end elevational view of the data capture device of FIG. 11.

FIG. 17 is a rear end elevational view of the data capture device of FIG. 11.

FIG. 18 is a somewhat diagrammatic side elevational view, similar to FIG. 12, but illustrating with dash lines a modification wherein the scanner module is provided with contacts at a rear end thereof for engagement with the external set of contacts of the terminal unit.

FIGS. 20, 21 and 22 are somewhat diagrammatic plan, side elevational and end views showing a modular data capture system wherein the user interface module and the peripheral modules are readily removed and replaced with modules of the same or different characteristics.

FIGS. 23, 24 and 25 are somewhat diagrammatic plan, side and end views wherein the user interface module of FIGS. 20–22 has been replaced by a much wider version, also illustrating the case where a peripheral module may provide a forwardly directed automatic reader as well as an RF communications link.

FIGS. 26, 27 and 28 are somewhat diagrammatic plan, side elevational, and end views wherein the user interface module is of intermediate size and wherein a compact automatic reader scans along a horizontal path when the long axis of the terminal is disposed vertically.

MODES FOR CARRYING OUT THE INVENTION

DETAILED DESCRIPTION OF FIGS. 1–10

Figure 1:
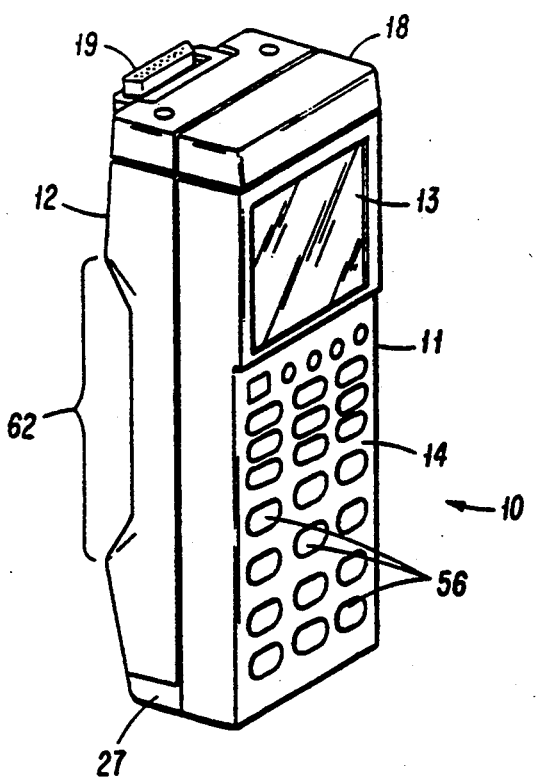
FIG. 1 is a somewhat diagrammatic frontal perspective view showing a hand-held data capture terminal which may be modified as shown in FIGS. 6–10 and FIGS. 11–19, to form embodiments of the present invention.

FIG. 1 shows a portable hand-held data capture terminal 10 embodying aspects of the present invention. The terminal 10 has an elongated housing formed of parts 11 and 12, the back housing part 12 of which is formed in a manner so as to enable a user to hold the device comfortably in one hand for extended periods of time.

In the preferred embodiment of the invention, terminal 10 may be powered by a rechargeable nickel-cadmium battery pack 28 (FIG. 2) or a plurality of AA size batteries. Enclosed within the terminal housing 11, 12 are four permanently mounted printed circuit boards 26, 37, 41, and 43, (FIG. 2), namely a host printed circuit board 37, a display printed circuit board 43, a keypad printed circuit board 41, and a peripheral controller printed circuit board 26. Interconnections between the circuit boards are accomplished through a plurality of pin and socket type connectors including pin type connectors 86 and mating receptacle type connectors 87. An exception is the interconnection between display board 43 and keypad board 41 which is accomplished through a resilient conductive pad 42. When assembled, front housing part 11 and back housing part 12 are joined together by a plurality of screws 88.

The front housing part 11 of the terminal 10 provides a mounting platform for a display 13 (FIG. 2) which may provide a visual indication of various types of information. In the preferred embodiment of the invention, display 13 is of a liquid crystal display (LCD) variety providing sixteen lines, with twenty characters per line, of display area. Optionally, the display 13 may be of a four line type. The display 13 may be mounted upon a display printed circuit board 43 which is then mounted or secured to front housing part 11 by a plurality of screws 58. In addition, the front housing part 11 may provide a mounting platform for a keypad 14 (FIG. 1), having a plurality of keys 56 thereon. In the preferred embodiment of the invention, keypad 14 is provided with either twenty-three or forty keys. The control and interface circuitry for keypad 14 may be contained on keypad printed circuit board 41 (FIG. 2) which is mounted or secured to front housing part 11 by a plurality of screws 59.

Electrical interconnections between the display printed circuit board 43 and keypad printed circuit board 41 may be accomplished through a resilient, conductive pad 42, which may be located between overlapping portions of the aforementioned circuit boards and retained in this location by means of the pressure exerted upon it when the respective circuit boards are mounted in the housing part 11. Conductive pad 42 may contain a plurality of generally parallel, spaced apart conductive elements embedded within it. The overlapping portions of display printed circuit board 43 and keypad printed circuit board 41 each contain a plurality of coplanar, generally parallel, and evenly spaced apart connector elements 60 and 61, respectively. The respective conductive elements of conductive pad 42, when conductive pad 42 is mounted between the overlapping portions of keypad printed circuit board 41 and display printed circuit board 43, are in positive contact with corresponding aligned connector elements 60 and 61, and provide respective paths for the transfer of electrical signals therebetween. Alternatively, the required electrical interconnections between display printed circuit board 43 and keypad printed circuit board 41 may be accomplished through a flexible multi-conductor ribbon type cable.

Figure 2:
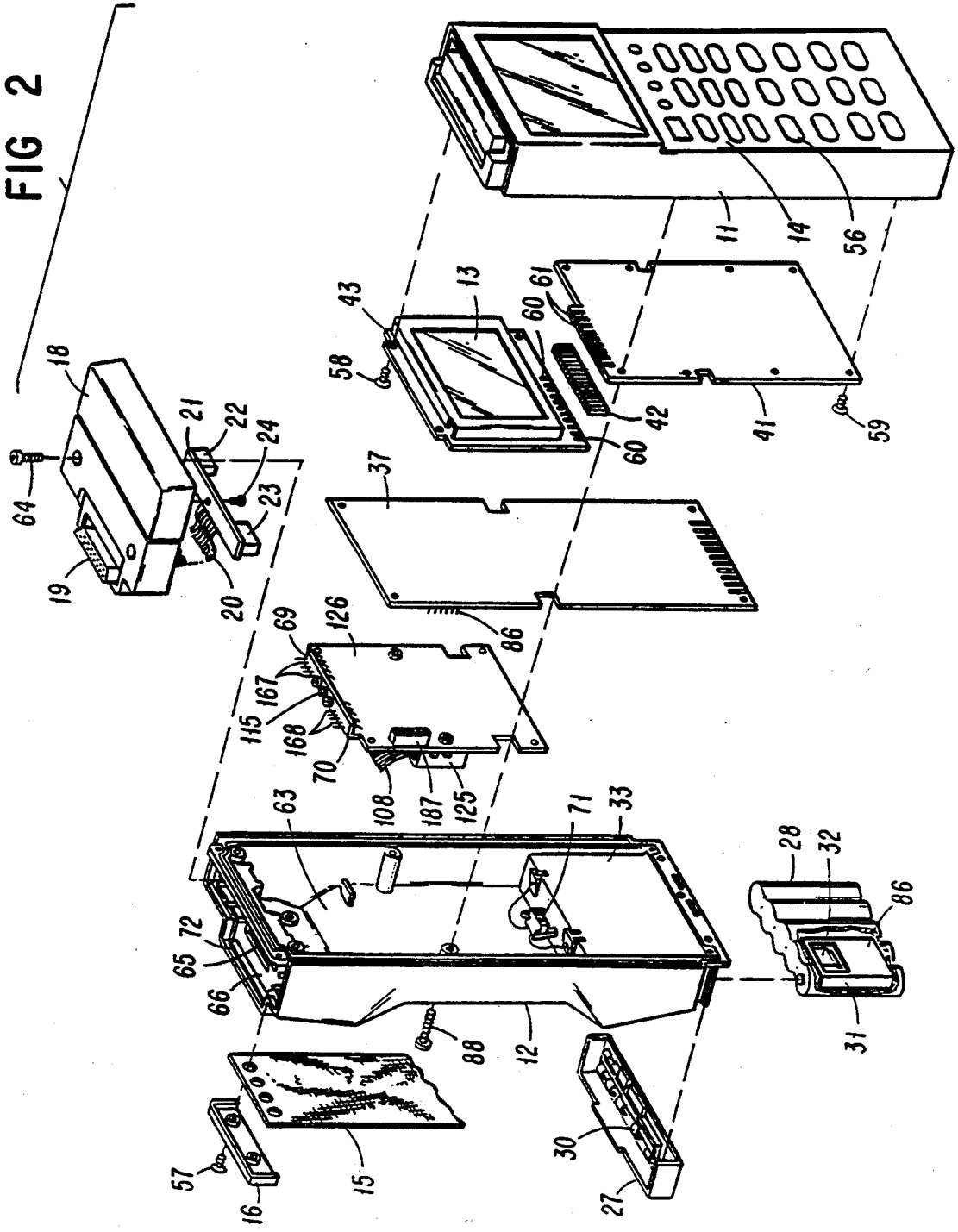
FIG. 2 is a somewhat diagrammatic exploded view of the hand-held terminal illustrated in FIG. 1.

The back housing part 12 of the terminal 10 may provide a mounting platform for a removable, elastic type flexible strap 15 (FIG. 2). Flexible strap 15 may allow the user of the terminal 10 to relax the user's grip on the terminal 10 for short periods of time, without actually removing the terminal 10 from the user's hand. The flexible strap 15 may be secured to the bottom of housing part 12 by means of two retaining clamps such as 16 (FIG. 2). Retaining clamps 16 are secured to housing part 12 through the use of screws such as 57, with two screws 57 securing each retaining clamp. In the preferred embodiment of the invention, retaining clamps 16 may be removed with simple hand tools, allowing the flexible strap 15 to be easily replaced. Beneath the flexible strap 15 and generally between retaining clamps 16, the bottom of housing part 12 is contoured in such a way that, when the terminal 10 is being held by the user, the user's hand is placed on a recessed area 62 (FIG. 1) in housing part 12 and beneath flexible strap 15.

Referring to FIG. 2, the top end of the terminal 10 may be enclosed with a removable end cap 18. End cap 18 is attached with two screws 64 to housing part 12. When installed on terminal 10, end cap 18 overlies and encloses cavity 63. Located on, and part of the end cap 18 may be a multiple pin D-sub type connector 19, which may in turn be direct or hard wired via a flexible multi-conductor ribbon type cable 20 to a connector platform 21, on which may be mounted two connector receptacles 22 and 23. Cable 20, connector platform 21 and connector receptacles 22 and 23 may also be mounted on and be part of end cap 18. Screws such as 24, FIG. 2, may secure parts 21, 22, 23 in a precise location with only connectors 22, 23 projecting beyond the confines of the end cap housing. The multiple pin D-sub connector 19 may provide a communications port capable of the two-way transfer of data with other compatible devices according to the RS-232C standard as defined by the Electronic Industries Association. When end cap 18 is installed on terminal 10, receptacles 22 and 23 automatically mate with a plurality of pins 67 and 68 which protrude through connector blocks 69 and 70. Pins 67 and 68, and connector blocks 69 and 70 are each attached or connected to peripheral controller board 26. In a preferred embodiment of the invention, the end cap 18 may be removable using common hand tools. Alternatively, a plain type of end cap housing which does not contain a D-sub connector 19 or any of its associated components such as 20-23, may be used in place of end cap 18. In addition, peripheral controller board 26 provides the electronic circuitry required to interface the two-way data transfer which may occur through D-sub connector 19. In a preferred embodiment, controller board 26 may be a peripheral type device which may be exchanged or otherwise configured toenable the use of various types of end cap devices. These various end cap devices may enable terminal 10 to perform a wide variety of functions not currently possible with existing hand held data capture devices including, but in no way limited to, the two-way transfer of data through space using radio frequency waves as the data carrying medium, the two-way transfer of data over telephonic communication links, and the two-way transfer of data between the terminal and a bar code reading device.

Referring again to FIG. 2, the cavity of the housing part 12 receiving the battery pack 28 may be enclosed by a battery compartment hatch 27. The battery compartment hatch 27 may have attached to its surface a plurality of conductive metallic type contacts 30. Metallic contacts 30, in conjunction with a plurality of metallic springs located in the battery compartment, may complete the electrical path of the batteries enclosed in the battery compartment. When the battery compartment hatch 27 is properly installed on the terminal 10, it comes in contact with a conductive metallic rod which extends the length of the battery compartment and is hard wired to battery supply connector 71, FIG. 2, and completes the ground or negative potential path for the batteries. The enclosed batteries are arranged in the battery compartment in a series type configuration to provide the required voltage. The positive potential of the battery path is completed by the hard wiring of a metallic spring to battery supply connector 71. Battery supply connector 71 contains a plurality of receptacles which mate with host board 37 to provide the battery power to the terminal 10. Battery compartment hatch 27 attaches to the bottom housing part 12 of terminal 10 through the interlocking and meshing of railings on both the battery compartment hatch 27 and bottom housing part 12. The battery compartment is formed by a cavity within terminal 10, with a somewhat rectangular opening on which three corners are rounded and one corner is somewhat squared.

Battery pack 28 may be constructed of a plurality of nickel-cadmium battery cells, arranged in such a way as to provide approximately six volts of direct current electrical power. In addition, battery pack 28 may contain a formed metallic plate 31 which may be attached to the nickel-cadmium batteries in such a way as to form a somewhat squared edge on one corner 86 of the battery pack 28. The somewhat squared corner 86 (FIG. 2) of the battery pack 28 may correspond with the previously described somewhat squared corner on the rectangular opening of the battery compartment, and may prevent the improper insertion of battery pack 28 into the battery compartment. In addition, metallic plate 31 may be further formed to create a conductive metallic shunt 32 (FIG. 2). When battery pack 28 is installed in computer terminal 10, metallic shunt 32 engages probes to create an electrically conductive path or short circuit between the probes. The probes may form part of the battery charging circuit of the terminal 10 and may disable this circuit when not electrically shorted together, thereby preventing the inadvertent and possibly hazardous application of recharging electrical power to non-rechargeable (e.g. alkaline) batteries.

In place of the battery arrangement 28, the batteries can be mounted in an enclosed drawer part with square and rounded edges, which slides endwise into a receiving compartment. External contacts on the drawer may be substituted for the array of external contacts as shown at 322, FIG. 11. The rear external contacts at the drawer external wall may be connected with respective spring contacts at the forward end of the drawer which spring contacts engage with fixed contacts in the roof of the battery compartment as the drawer is fully inserted. A coin operated latch may be rotatable through a given angular amount in one direction to lock the battery drawer in place, and may be rotatable in the opposite direction to unlock the battery drawer.

Figure 3:
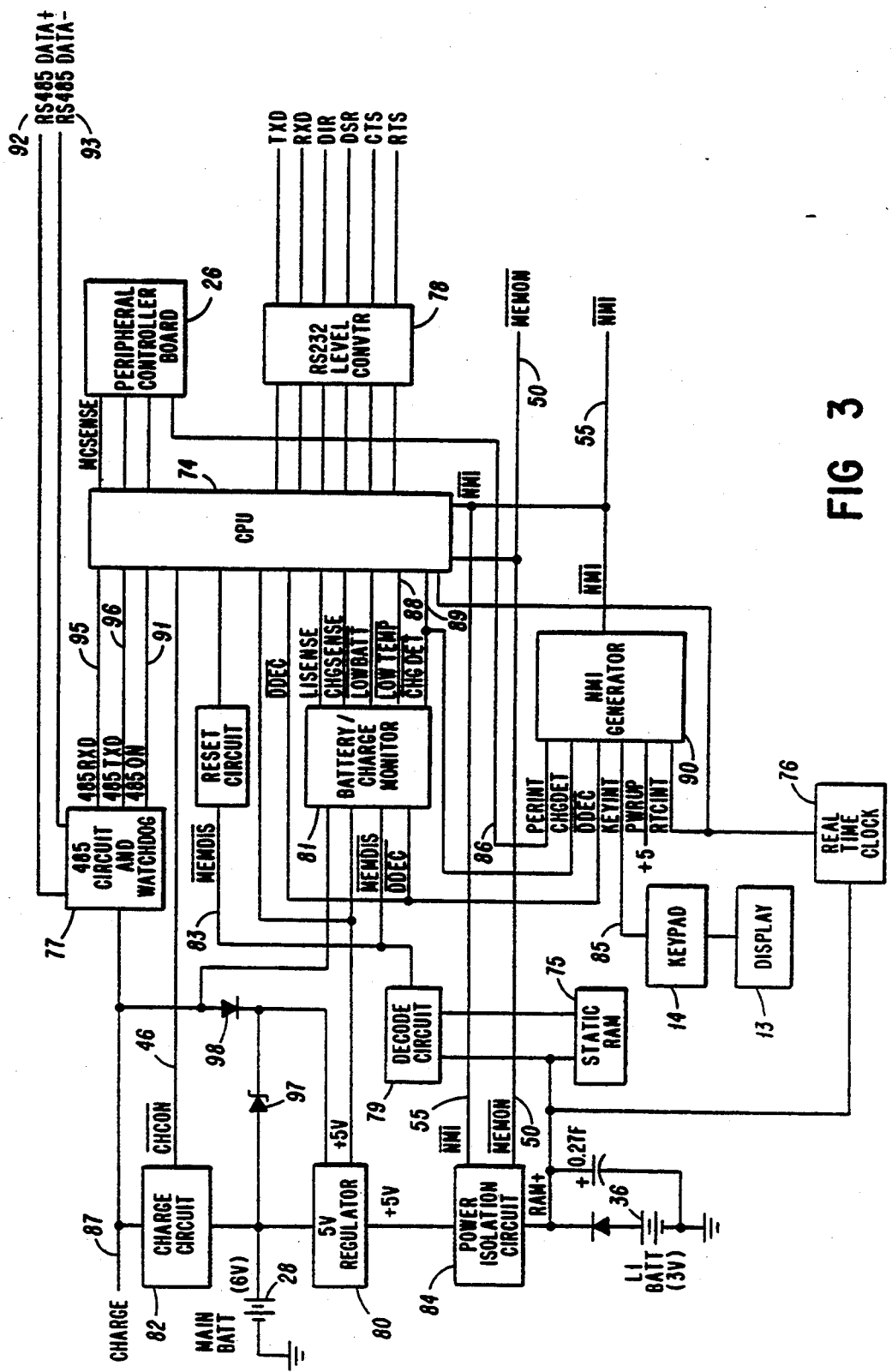
FIGS. 3 and 4 are schematic diagrams showing the major electronic circuits and components contained within the terminal of FIGS. 1 and 2 and the interconnections between them, FIG. 4 showing preferred circuit details for the power control components of FIG. 3.

Description of FIG. 3

Referring now to FIG. 3, the terminal functional block diagram is illustrated. A central processor unit (CPU) 74 may contain program storage and reside on the host printed circuit board. CPU 74 controls all terminal functions, executes machine instructions in proper sequence, and supervises data communication with devices inside and outside the terminal 10. However, it may allow an optional auxiliary processor unit on the peripheral controller board 26 to control some external access (e.g. reading from and/or writing to an auxiliary memory card). The CPU 74 may abort all communications throughout terminal 10 should power available from the main batteries (e.g. nickel-cadmium battery pack 28) drop below a predetermined level. All access to static RAM 75, the real time clock 76, the keypad 14 and keypad circuit board 41, and display 13 and display circuit board 43 are accomplished through CPU 74. The CPU 74 also controls the charging current applied to battery pack 28 by control of CHGON line 46, FIG. 4, and generates a signal on MEMON line 50 to initiate a sleep mode of the terminal. In addition, CPU 74 allows activation of the 485 circuit and watchdog timer component 77, RS232 level converter 78, and the backlight of display 13.

The memory in static RAM 75 is decoded in the decode circuit 79. MEMDIS line 83 is coupled with this circuit and will inhibit access to static RAM 75 in the event the five volt regulator 80 has dropped out of regulation, indicating the installed batteries (e.g. nickel-cadmium battery pack 28) are no longer providing the necessary voltage. In the preferred embodiment of the invention, memory in the static RAM 75 may be selectively configured in one of varying sizes.

The terminal 10 may be equipped with a battery/charge monitor circuit 81 as well as a battery charge circuit 82. The battery/charge monitor circuit 81 monitors the main battery and provides a signal on the LOWBATT line if battery voltage drops below a certain value. The signal on the LOWBATT line informs the CPU 74 that battery power is getting low, and CPU 74 in turn will notify the user through the display 13. The terminal 10 will continue to operate normally as long as the LOWBATT line remains in a high logical state. If the LOWBATT line goes low, the terminal 10 will switch to its inactive (sleep) state, but will be allowed to become active if a key 56 (FIG. 1) is pressed. A further output of the monitor component 81 is the DDEC line. The DDEC line provides a true indication if the five volt regulator 80 begins to drop out of regulation. When the DDEC line goes low, the terminal 10 switches to sleep mode promptly, saving all data in the static RAM 75, which will have backup power in the event that the main batteries are removed. Finally, when the output of the main batteries (through five volt regulator 80) drops to a predefined level, the MEMDIS line 83 will carry a low logical signal, causing the static RAM 75 to be disabled, the CPU 74 to be reset and the transistor 54 (FIG. 4), located in the power isolation circuit 84, to switch to nonconducting mode. The CPU 74 is equipped with an analog input port which allows it to monitor several other battery/charge conditions. The signals available at this port may provide information regarding the charge level, for example. Another signal which may be monitored here is an extended duration signal emanating from the KEYINT line 85. The controller board 26 may also provide an interrupt signal on PERINT line 86, which is made available to the CPU 74 on this analog port.

The charge circuit 82 is disabled unless a shorting mechanism (conductive metallic plate 32, FIGS. 2 and 4) which is located on and part of the nickel-cadmium battery pack 28, is present and properly installed in the battery compartment as described previously. Charging of an installed nickel-cadmium battery pack 28 occurs automatically when a charge voltage of a predetermined value is present on CHARGE line 87. Charging of the installed nickel-cadmium battery pack 28 may occur selectively at a rate of approximately twenty milliamps or a rate of approximately seventy-five milliamps, and is determined by the terminal software through CPU 74. The CPU 74 also monitors the ambient air temperature and, if below a predetermined level, preferably approximately five degrees Celsius, the CPU 74 causes the LOWTEMP line 88 to provide a signal, which causes constant current charge to default to the lower charge (twenty milliamps) rate. When terminal 10 is first attached or otherwise connected to a charger, the CHGDET line 89 goes active for approximately four milliseconds, then returns to its inactive state. This causes NMI generator 90 to generate a pulse to wake the terminal 10 from its sleep mode and signal that a charger is present.

Figure 11:
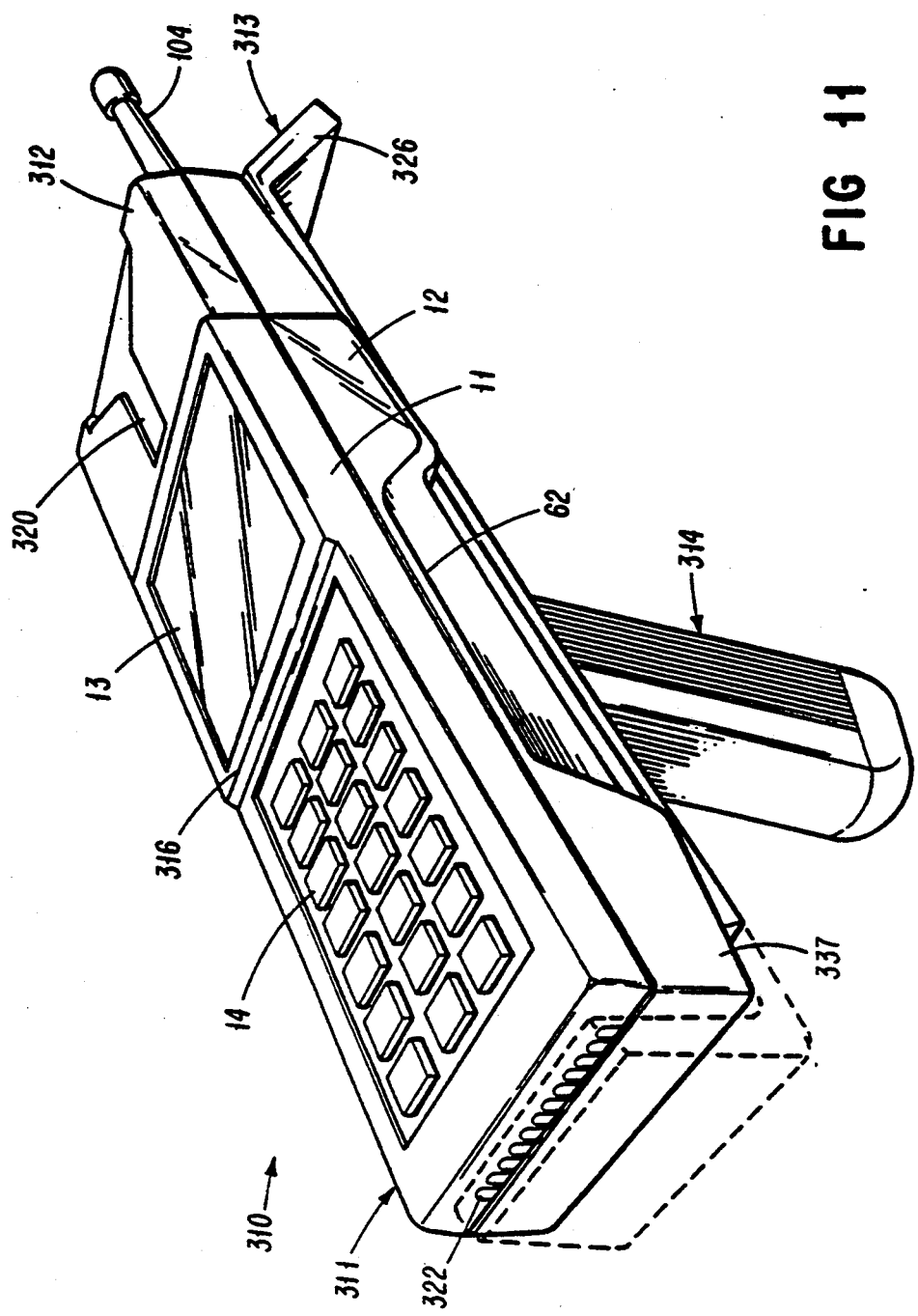
FIG. 11 is a somewhat diagrammatic perspective view showing a modular hand-held data capture device in accordance with the present invention.

A charger must be attached to terminal 10 for the 485 circuit and watchdog component 77 to function, as this circuit is powered by the charger. The 485 circuit and watchdog circuitry 77 may provide the terminal 10 with a communications port capable of synchronous two-way data communication with other compatible devices, transferring data at a rate not greater than five hundred thousand bits per second, according to the predominate RS485 standard as defined by the Electronic Industries Association. When CPU 74 detects the presence of a charger, it activates the 485 circuit and watchdog through 485ON line 91. Data may then be transmitted and received by terminal 10 on RS485 DATA+ line 92 and RS485 DATA- line 93, these lines being connected to a pair of a number of coplanar, generally parallel and evenly spaced conductive metallic pads 322 (FIG. 11). Received data is applied to the CPU 74 from the 485 circuit and watchdog circuit 77 on 485RXD line 95, while transmitted data is applied to the 485 circuit and watchdog circuit 77, from CPU 74, on 485TXD line 96.

Five volt regulator 80 may operate from either the main battery supply or an attached charger. If both are present, the output voltage of the charger will e higher than the battery voltage, causing five volt regulator 80 to choose current from the charger supply rather than the batteries. This is accomplished through "OR" wiring of diodes 97 and 98.

Terminal 10 has been designed to be in an inactive state (sleep mode) for the majority of time to conserve battery power. As described previously, NMI line 55 must be pulsed for terminal 10 to wake up and begin program execution. The pulse on NMI line 55 is generated by the NMI generator 90 and may be generated by a pulse on KEYINT line from the keypad 14, a pulse on RTCINT line from the real time clock 76, simultaneous pulses on LOWBATT line and DDEC line, a pulse on CHGDET line 89, a pulse on PERINT line 86 from peripheral controller board 26, or a pulse on the PWRUP line (from the 5 V regulator 80).

Power is applied to the peripheral controller board 26 under the control of CPU 74. Once the controller board power is stable and the controller board microprocessor (212, FIGS. 9 and 10) is stable, the controller board microprocessor begins a hand shaking sequence with CPU 74 to establish a communication link. This link has some software support to monitor data integrity throughout the transfer of data. The controller board 26 is equipped with a pair of analog switches which isolate the data bus on the controller board 26 from the memory data bus on the host printed circuit board 37. This isolation prevents inadvertent data bus interference during the power up routine of the peripheral controller board microprocessor.

Figure 4:
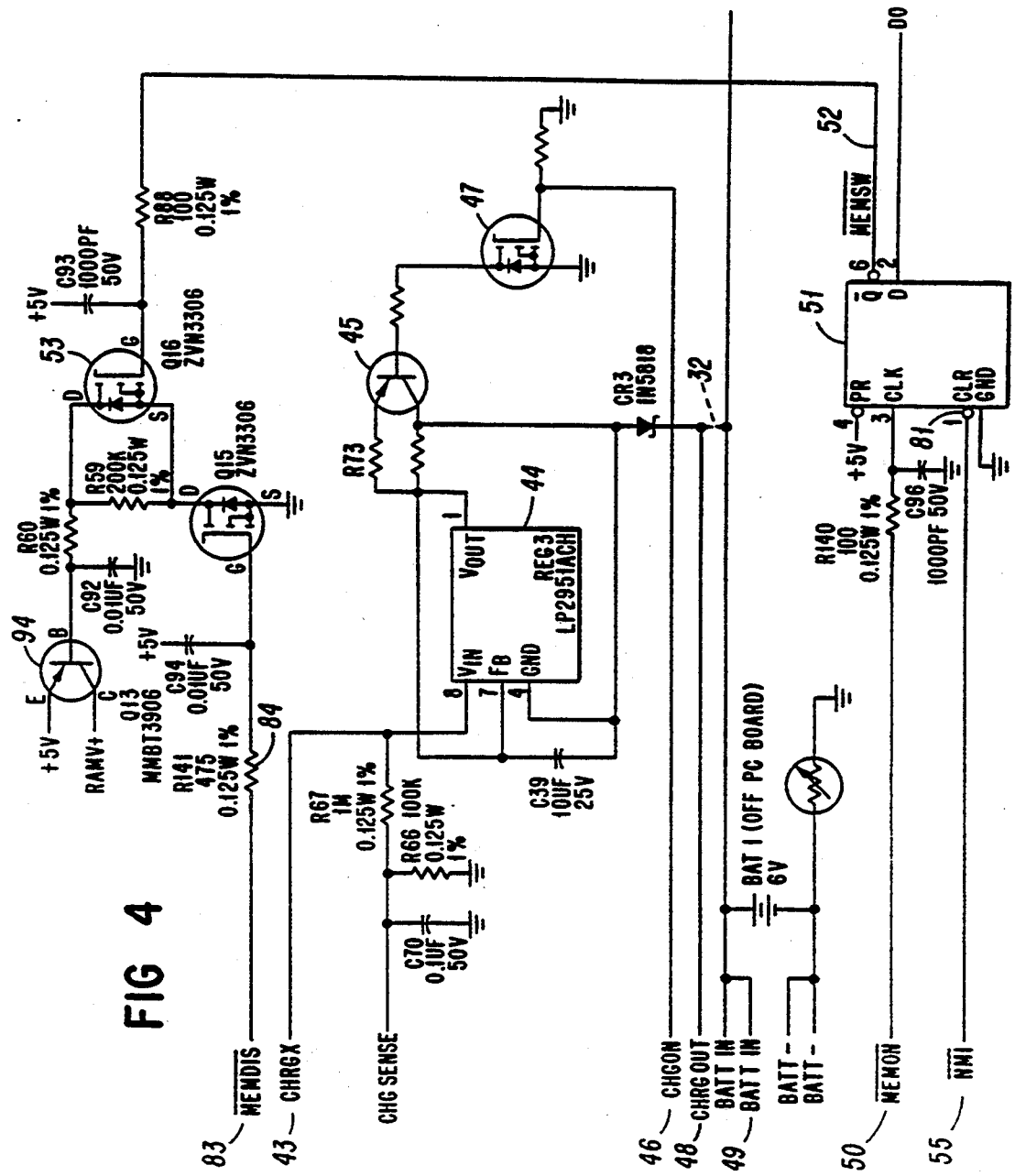

Description of FIG. 4

Referring to FIG. 4, unique battery charging and terminal sleep mode circuits are illustrated. When terminal 10 is attached or otherwise connected to a compatible recharging device, a charging voltage may be introduced on the CHRGX line (FIG. 4). The charging voltage on CHRGX line 43 may then be applied to a voltage regulating device 44 e.g. type LP 2951 ACM. The regulated charging voltage output of regulating device 44 may be applied to a transistor switch 45 through a resistor R73. Transistor switch 45 may be software controlled, and may be activated or turned on when the signal on CHGON line 46 changes its logical state, which may cause field effect transistor 47 to change state which then may cause transistor switch 45 to change state. Transistor switch 45 may provide a constant charging current through a diode CR3, to the installed battery pack 28, for a predetermined length of time. The charging current may be applied to installed battery pack 28 through metallic terminals in the battery compartment shorted by metallic shunt 32 on the battery pack, FIG. 2.

The sleep mode circuitry of terminal 10 monitors the input activity of the terminal 10 and, when no activity is detected for a predetermined length of time, may cause the terminal 10 to shift to a stand-by or sleep mode to conserve the power supplied by the installed batteries. When in the inactive state, the memory array and real time clock circuits of terminal 10 require less power than when in an active state. In operation, when the terminal 10 has been inactive (e.g. no keys 56 are pressed on keypad 14) for a predetermined amount of time, MEMON line 50 may pulse. This pulse may be sensed on the CLK input of flip-flop integrated circuit 51, which may cause its Q output to switch levels. Resistor R140 and capacitor C96 may ensure that no false signals are received by flip-flop 51. The Q output of flip-flop 51 is designated MEMSW line 52. The state of MEMSW line 52 may cause field effect transistor 53 to change state. MEMSW line 52 may be filtered by resistor R88 and capacitor C93. When field effect transistor 53 changes states, it greatly reduces the amount of current flowing through the base of transistor 54 by causing resistor R59 to be placed in series with resistor R60. The greatly reduced current flow through the base of transistor 54 allows the regulated supply of the terminal 10, provided by the power of the installed batteries applied through a voltage regulating device, to provide less current, thus increasing the active life of the installed batteries.

When terminal 10 again becomes active (e.g. a key 56 is depressed on keypad 14) NMI line 55 may pulse. The pulse on NMI line 55 may be sensed by flip-flop 51, FIG. 4, at its CLR input, and may then cause the Q output of flip-flop 51 to change state. The state of MEMSW line 52, FIG. 4, at the Q output of flip-flop 51 may now cause field effect transistor 53 to reset to its former state, returning current flow through the base of transistor 54 to its active level.

The terminal 10 may operate exclusively from the power supplied through a regulating device by the installed batteries (e.g. battery pack 28, FIG. 2) until the MEMDIS line 83, FIG. 4, changes state. The MEMDIS line may change state when the installed batteries or attached charger do not provide sufficient voltage to operate the terminal. When the MEMDIS line changes state, it may change the state of field effect transistor Q15. The MEMDIS line may be filtered by resistor R141 and capacitor C94. When field effect transistor Q15 changes state it may cause interruption of current flow through the base of transistor 54, effectively removing the regulated supply of terminal 10 from the memory array. When this occurs, a standby lithium battery or a charged capacitor may supply the memory array and real time clock circuits until such time that the main power supply is returned to the level required to power the terminal 10. A charged capacitor may provide short term back-up power for the terminal 10, with the lithium battery providing power when the stored charge of the capacitor is depleted. The lithium battery may provide long term back-up power. When the main power of terminal 10 is restored to an operational level, the MEMDIS line 83, FIG. 4, may return to its former state which may restore normal current flow through the base of transistor 54.

Figure 5:
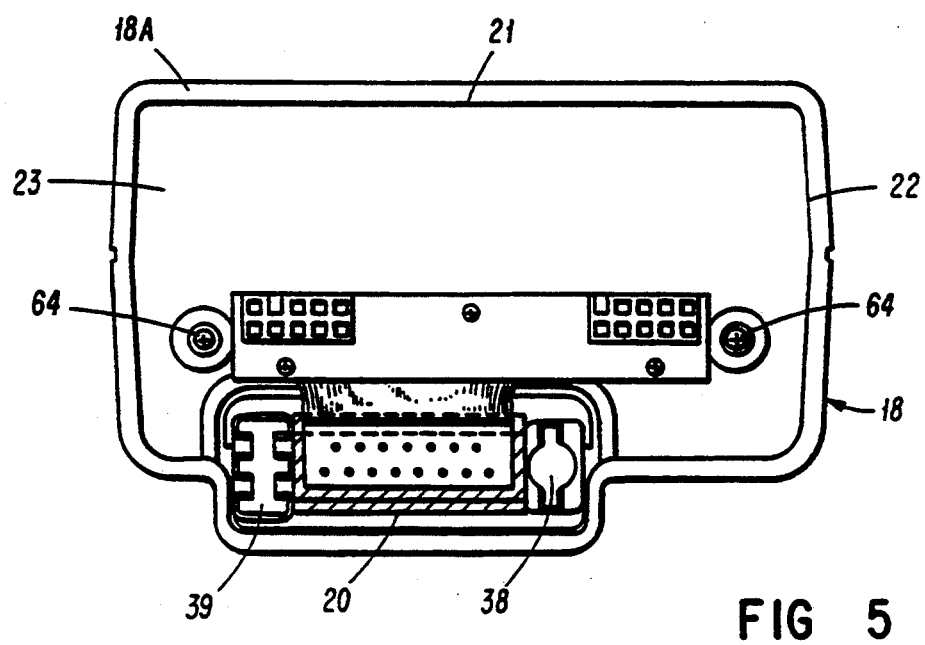
FIG. 5 is a plan view showing the interior of the end cap of the terminal shown in FIGS. 1–4.

Description of FIG. 5

FIG. 5 is a view looking into the interior of end cap 18. Three screws such as 24 secure the connector platform 21 at the correct position within the end cap 18. Two guide parts 38 and 39 are precisely located so as to project into the open end 72 of housing part 11 and interfit with cooperating surfaces at the end 72 so as to insure that the connector receptacles 22, 23 are correctly aligned with pins 67, 68 as the end cap 18 is applied to the terminal. This type of mechanical guidance could also be provided for the automatic electrical interconnection of all of the various modules herein which are to be mechanically joined with each other.

Description of FIGS. 6 through 10

Figure 6:
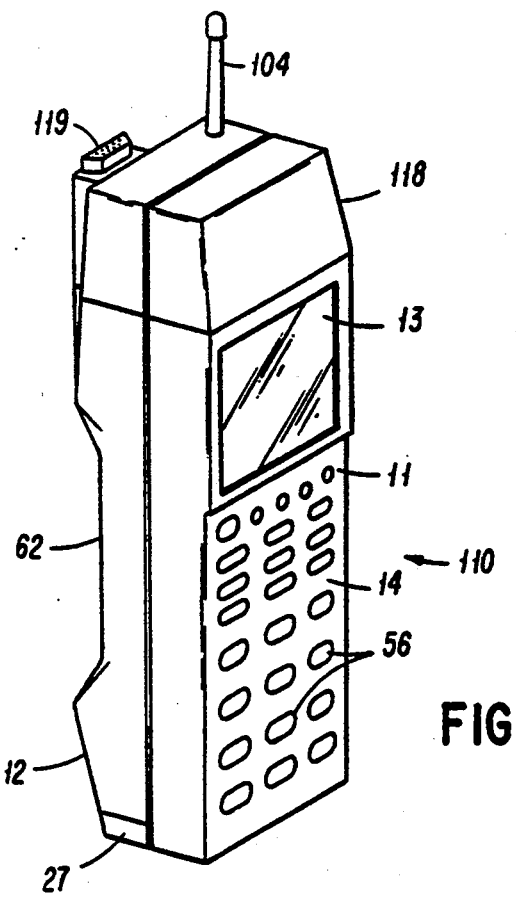
FIG. 6 is a perspective view of an embodiment including the basic terminal of FIGS. 1–5 and further including provision for on-line radio frequency communications capability.

Referring to FIGS. 6–10, an embodiment of the invention is disclosed for providing wireless data communication with a remote receiver. In FIG. 6, it can be seen that terminal 110 includes the basic housing parts 11 and 12 of FIGS. 1–5, and is further provided with a modular adaptor end cap 118. Antenna 104 and external connector fitting 119 are attached to the end cap 118. (Corresponding reference numerals have been applied to identical parts in FIGS. 1–5 and 6–10 and such parts need not be further described). Keys 56 are depressed by the user to enter data and to control the functions of terminal 110, including causing terminal 110 to transmit or receive data by radio transmission means. Display 13 provides visual information concerning RF transmissions received by the terminal.

Figure 8:
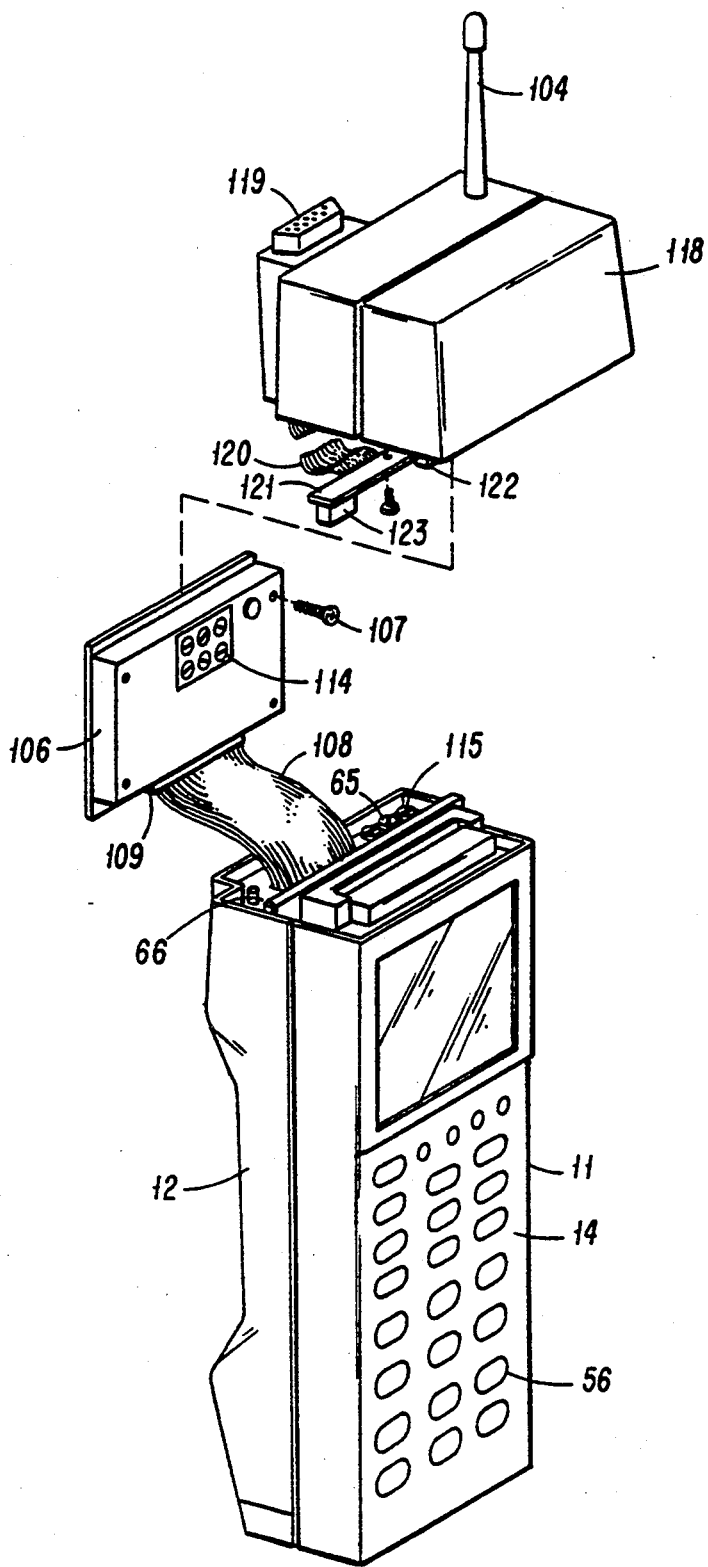
FIG. 8 is an exploded perspective view of the embodiment of FIG. 6.

From FIG. 8, it can be understood that end cap 118 may be readily removably mounted on housing parts 11 and 12. External connector fitting 119 provides for interconnection to optional peripheral devices and is electrically connected through wiring 120 to connectors 122 and 123 which are mounted to connector platform 121. Connectors 122 and 123 engage with the pins of mating connectors 67 and 68 (FIG. 2) of peripheral controller card 26 when end cap 118 applied to housing parts 11 and 12.

Radio module 106 mounts within end cap 118 by suitable mounting means such as indicted by screw 107 (FIG. 8), and is electrically coupled to peripheral controller card 26 by ribbon cable 108. Ribbon cable 108 is detachably connected to radio module 106 by a connector 109 affixed to the end of cable 108, and enters housing part 11 through opening 65 in wall 66. Ribbon cable 108 connects at 25, FIG. 2, with the peripheral controller card 26, and serves to interconnect radio module 106 and peripheral controller card 26. Adjusting elements 114 (FIG. 8) are provided on radio module 106 for frequency tuning and signal level adjustment purposes.

Figure 7:
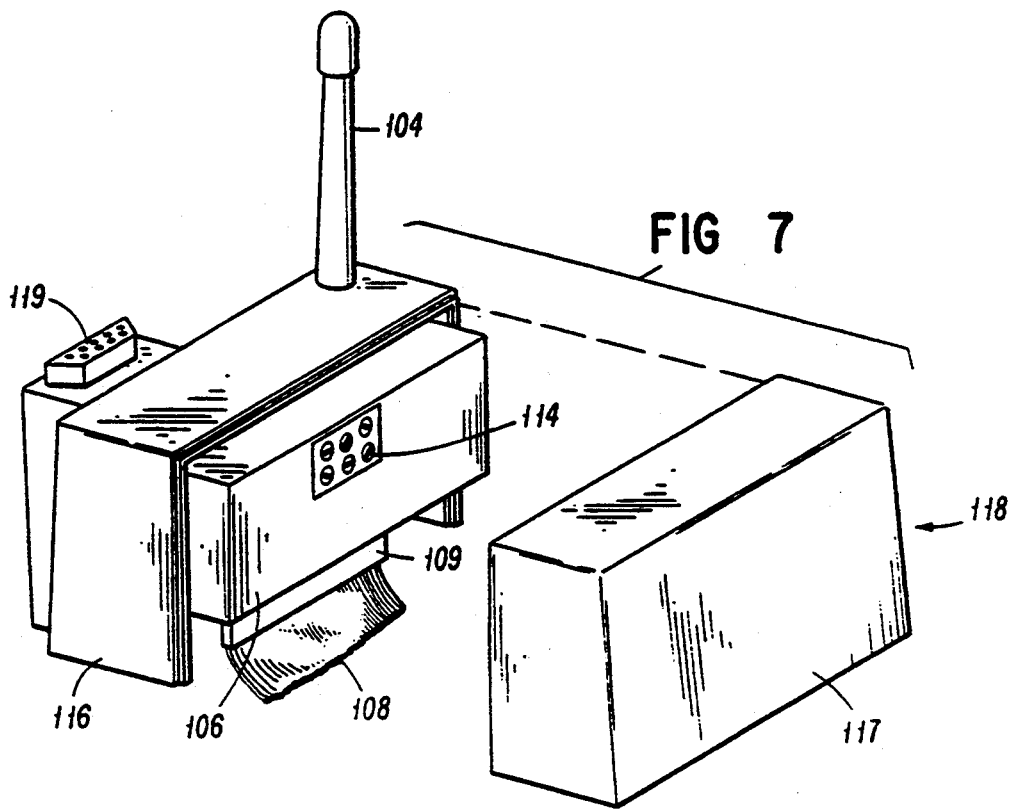
FIG. 7 is an exploded perspective view of the modular adaptor end cap of the embodiment of FIG. 6.

Referring now to FIG. 7, it can be seen that end cap 118 comprises housing members 116 and 117 which may be separated when end cap 118 is removed from housing parts 11 and 12 in order to provide access to adjusting elements 114 of radio module 106.

Figure 9:
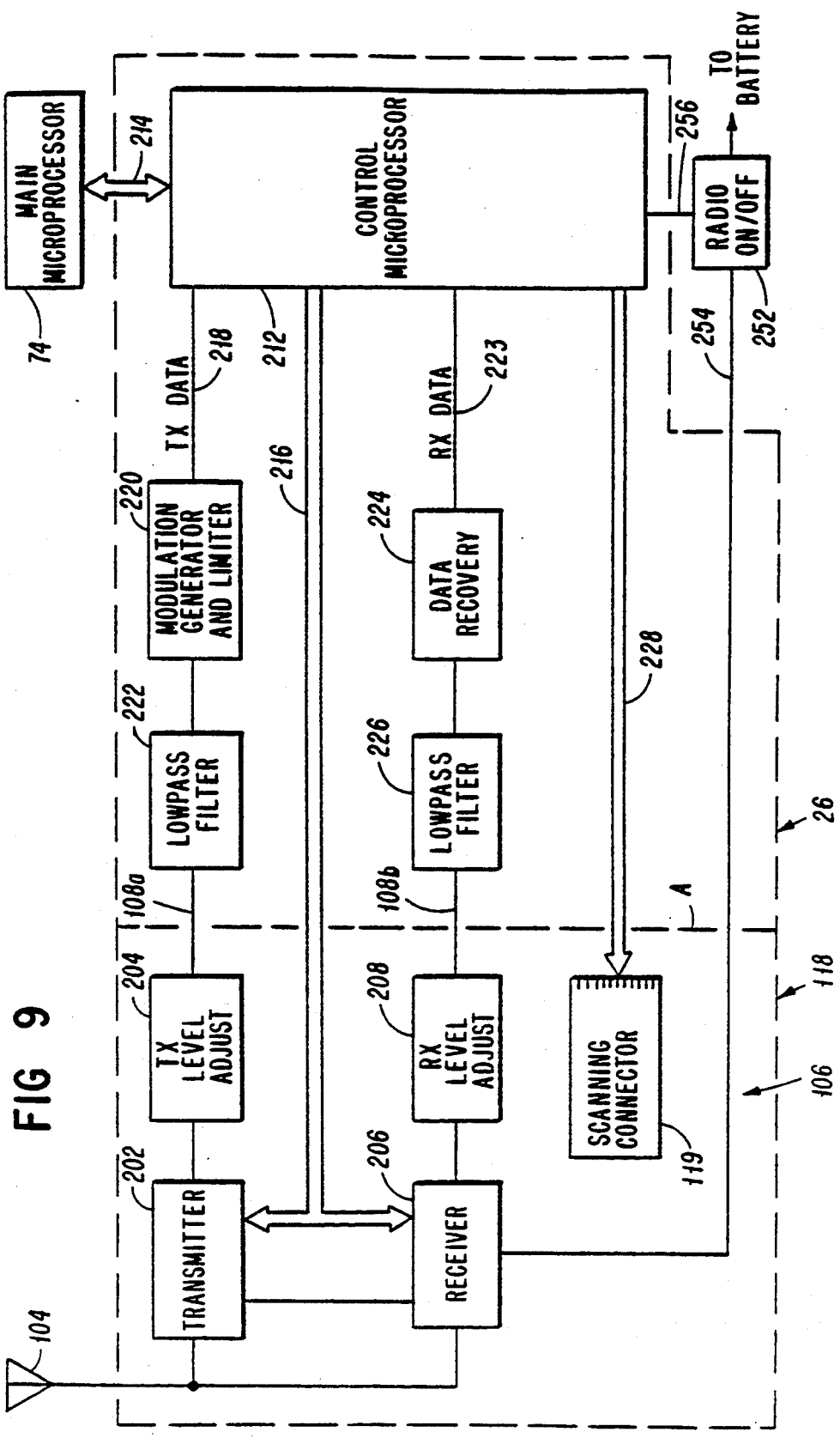
FIG. 9 is a block schematic diagram showing the electronic system components of the embodiment of FIG. 6.

Referring to the block diagram of FIG. 9, it can be appreciated that radio module 106 houses transmitter 202 which is coupled to antenna 104. Transmitter 202 is coupled to transmit level adjust circuitry 204. Receiver 206 is coupled to antenna 104 and to receive level adjust circuitry 208. Dashed line A separates the components located on radio module 106 from components located on peripheral controller card 26. Control microprocessor 212 communicates with main microprocessor 74, FIG. 3, of housing part 11 through coupling means 214 which is provided by connectors 86, 87, FIG. 2. Control microprocessor 212 is coupled to transmitter 202 and receiver 206 by coupling means 216 along which are communicated radio control signals. Data to be transmitted is received from processing unit 74, FIG. 3, and is forwarded by control microprocessor 212 over TX data line 218 to modulation generator and limiter component 220. Modulation generator and limiter component 220 is coupled to first low pass filter 222. Data received by antenna 104 is delivered to control microprocessor 212 on RX data line 223 which couples control microprocessor 212 to data recovery element 224 which is coupled to a second low pass filter 226. Lines 108a and 108b and also lines 216 are part of ribbon cable 108 and serve to couple the circuitry of peripheral controller card 26 to radio module 106.

External connector fitting 119 is coupled to control microprocessor 212 by scanning interface signal lines 228 associated with connectors 67, 68, FIG. 2, and 122, 123, FIG. 8, and wiring 120, FIG. 8.

Peripheral control adjustment elements 115 are mounted to peripheral controller card 26 such that these adjustment elements 115 are accessible to the user through opening 65, thereby obviating the necessity of any disassembly of housing parts 11 and 12 in order to effectuate adjustments to the peripheral controller card 26.

In operation, the user may remove modular adaptor end cap 118 from housing parts 11 and 12 when adjustment of radio components is desired. Adjusting elements 114 (FIG. 8) may be accessed by the separation of housing members 116 and 117 (FIG. 7) while radio module 106 continues to be electrically connected with peripheral controller components on card 26 through ribbon cable 108. In addition, peripheral control adjustment elements 115 (FIG. 8) of peripheral controller card 26 (FIG. 2) may be accessed when end cap 118 is removed from housing parts 11 and 12. The user may communicate with a remote host computer in "real time" by operation of keyboard 14 which provides signals to main microprocessor 74 (FIG. 9). Main microprocessor 74 processes the signals and communicates them to control microprocessor 212 of peripheral controller card 26. Control microprocessor 212 and its associated circuitry on peripheral controller card 26 processes the signals to superimpose them upon radio transmission frequencies, and communicates the processed signals to transmitter 202 which is coupled to antenna 104 and which thereby causes their transmission through space from antenna 104 by electromagnetic radiation. A remote host computer responding to terminal 110 transmits radio frequency signals which are received by receiver 206 through antenna 104. Received signals are processed on peripheral controller card 26 and are provided to control microprocessor 212 which communicates the processed signals to main microprocessor 74. Microprocessor 74 displays the received information upon display 13 so that it can be observed by the user.

Figure 10:
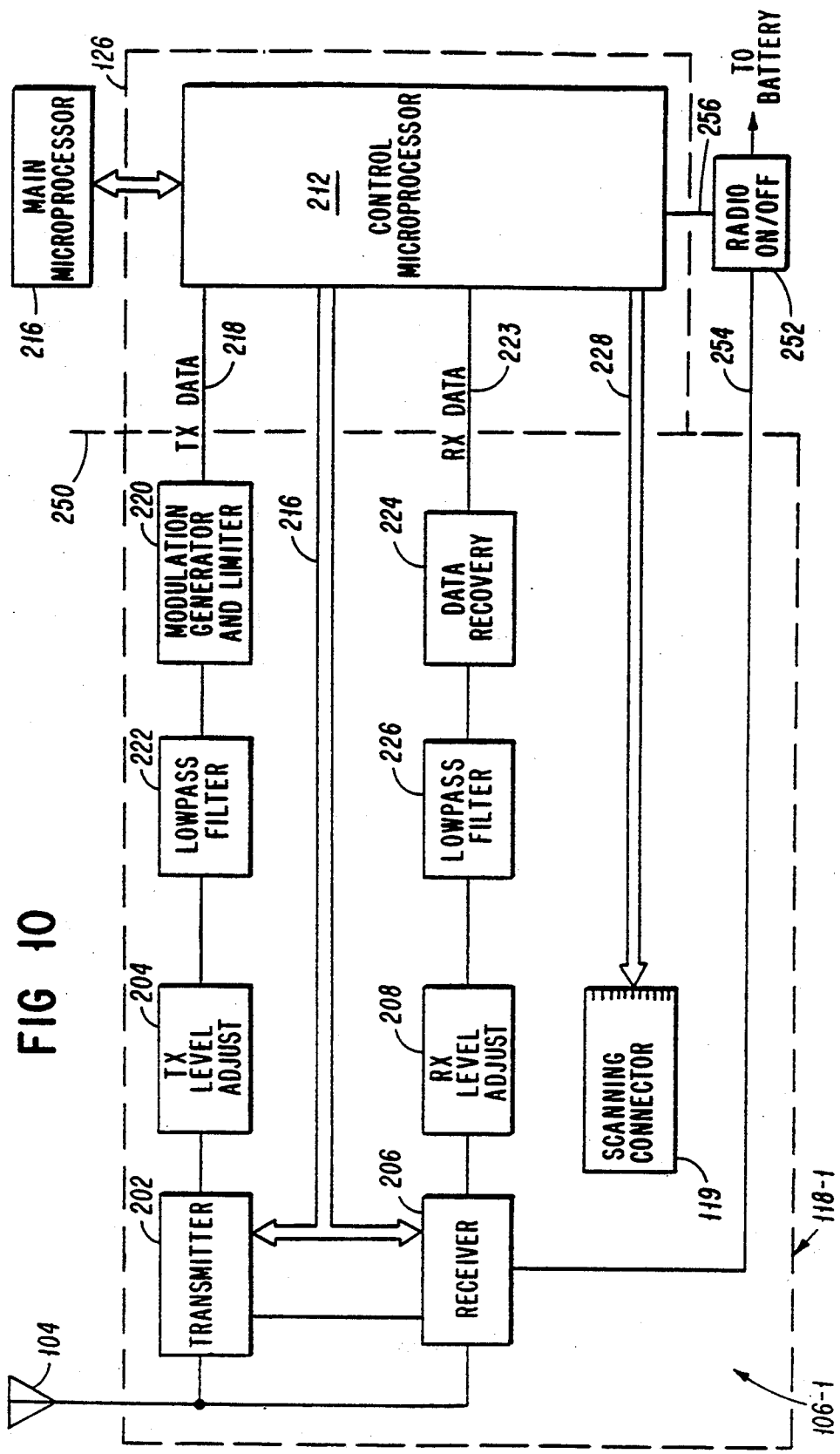
FIG. 10 is a block schematic diagram similar to FIG. 9, but showing an improved circuit arrangement for facilitating interchangeability of the RF end cap module and in particular avoiding the need for any tuning adjustments when an RF end cap module is applied to the basic terminal in the field.

FIG. 10 shows a modification of the embodiment of FIG. 9 which enables the replacement of the RF adaptor module without requiring a tuning adjustment of the module. In this embodiment the control microprocessor 212 is on the peripheral controller card, while components 220, 222, 224 and 226 are included in the radio module 106-1 forming part of the RF modular adaptor end cap 118-1. This results in a digital interface at 250 between the peripheral controller card of the basic terminal and the radio module of the RF adaptor end cap.

Since the signals transmitted across the digital interface are at standardized logic levels, there is no need for tuning adjustment of the RF module to adapt it to a particular basic terminal. The lines 216, 218 and 223 may form part of a ribbon cable corresponding to cable 108 with a connector corresponding to connector 109 for plug-in coupling with a mating connector of radio module 106-1. Multiconductor line 228 may be implemented via mating connectors such as 67, 22 and 68, 23 (FIG. 2) as in the previous embodiments. In each embodiment, power from the battery pack 28 may be supplied to the circuitry of the RF end cap under the control of a radio on/off switch 252, the power supply path 254, FIG. 10, being comprised by conductors of a ribbon cable such as 108, for example. The control microprocessor 212 is coupled with switch component 252 as indicated at 256, so that all power to the RF end cap can be switched on and off as required to minimize battery drain.

Since the peripheral circuit means including 212, FIG. 10, only transmits standardized digital signals and battery power to the modular adaptor end cap, the end cap circuits can be pre-adjusted at the factory and adjustments by the end user in assembling the modular adaptor end cap with the terminal can be avoided. The peripheral circuit board 26 (FIG. 2) and end cap 18 can be replaced by peripheral controller board 126, FIG. 10, and the end cap 118-1 with radio module 106-1, without requiring any other hardware changes in the terminal. Then the end cap with radio module 106-1 can be replaced with a new identical end cap as needed without requiring any adjustments in the digital outputs from the peripheral controller board, and without requiring any tuning adjustments of the modular adaptor end cap.

To replace the modular adaptor end cap 118-1 with the RF module 106-1, the end cap is removed as in FIG. 8, and the RF section 106-1 separated at connector 109, FIG. 8. A new end cap is then coupled with ribbon cable 108 by means of connector corresponding to 109. This completes the new digital signal paths which are as represented at 216, 218, 223, 254, FIG. 10.

Example According to FIG. 10

In an exemplary embodiment according to FIG. 10, the basic hand-held terminal configuration formed from housing parts 11 and 12, FIG. 2, has peripheral adaptor circuit means 126, FIG. 10, connected therewith via peripheral connector means similar to 108, 109 (FIG. 8), accessible at the upper end of the terminal configuration (see FIG. 8). The basic terminal selectively receives a compatibility end cap (e.g. 18, FIG. 2) for enclosing the upper end and providing a resultant hand-held terminal of dimensions compatible with an existing terminal receptacle e.g. of a portable printer. In the portable printer the receptacle for the terminal has an electrical connector at one end for mating with connector 19, FIG. 1, and a spring-urged retainer at an opposite end for retaining the terminal in operative relation to the printer receptacle.

Where it is anticipated that the terminal configuration is to be later adapted to provide an RF link to an external transceiver, the basic terminal configuration may be provided with peripheral adapter circuit means such as represented at 126, FIG. 10. The peripheral input/output means at digital interface 250, FIG. 10, may be embodied in a cable and connector (such as 108, 109, FIG. 8) which is passively contained within a compatibility end cap module such as 18, FIG. 1, but is ready for plug-in connection with RF module 106-1, FIG. 10, of a modular adaptor end cap 118-1, FIG. 10.

DESCRIPTION OF FIGS. 11 THROUGH 19

In the illustrated embodiment of FIGS. 11–19, a unitary hand-held data capture device 310 comprises housing parts 11 and 12 forming a data terminal body 311, a RF module 312 (corresponding to module 118, FIG. 9, or 118-1, FIG. 10), a scanner module body 313 and a handle 314. The data terminal formed by components 311 and 312 has a frontal face 316 with user-device input and/or output interface means such as a manual data entry keyboard 14 and a display means at 13. The frontal face may have an indentation pattern at 320 for assisting in the aiming of the device in relation to a data source such as a bar code label on a product container or the like.

In a preferred construction, the terminal body 311 has a set of external contacts 322 for coupling of power and data signals of various types. The RF module 312 may include a stub antenna 104 projecting in a longitudinal direction, and the scanner body 313 may include a scanner extension part 326 which serves to direct scanner energy (e.g. optical energy) obliquely to the general plane of the frontal operating panel 316. This serves to insure that under normal scanning conditions, the frontal panel 316 will be facing the user during scanning operation so that for example, the user can verify the scanner data as it appears on the display 13.

FIG. 12 shows the device 310 as having a rubber bumper 331, 332 extending about the exterior sides of the terminal body 311 and the RF module 312 to protect the device 310 against lateral impact.

A connector 334 corresponding to connector 119, FIG. 8, e.g. a standard 15-pin D subminiature connector, may face longitudinally in a forward direction from a section 335 of the RF module 312. The connector 334 may correspond in its pin assignments with the connector commonly present on RF terminals such as the model 2210 RF terminal of Norand Corporation, Cedar Rapids, Iowa. The connector has pins assigned to the transmission of scanner signals, RS-232 signals, charge potential, and power out, for example. In the illustrated embodiment, the terminal body 311 may contain rechargeable batteries in a battery compartment at section 337, and battery power may be supplied from the batteries to the RF module by a direct connection and via connector 334 to the scanner module.

As shown in FIG. 13, the scanner module body 313 is provided with a connector 340 which is mated with terminal connector 334 during the assembly of the terminal parts 311 and 312 with the scanner module. A forward recess 343 of the scanner module body 313 receives terminal housing sections 335, 338, while a rearward recess 344 accommodates a transverse rib 345, FIG. 12, on the terminal body 311. The scanner module may have six alignment holes 351–356, and four screw holes 357–360 for use in securing the terminal body 311 therewith.

Figure 15:
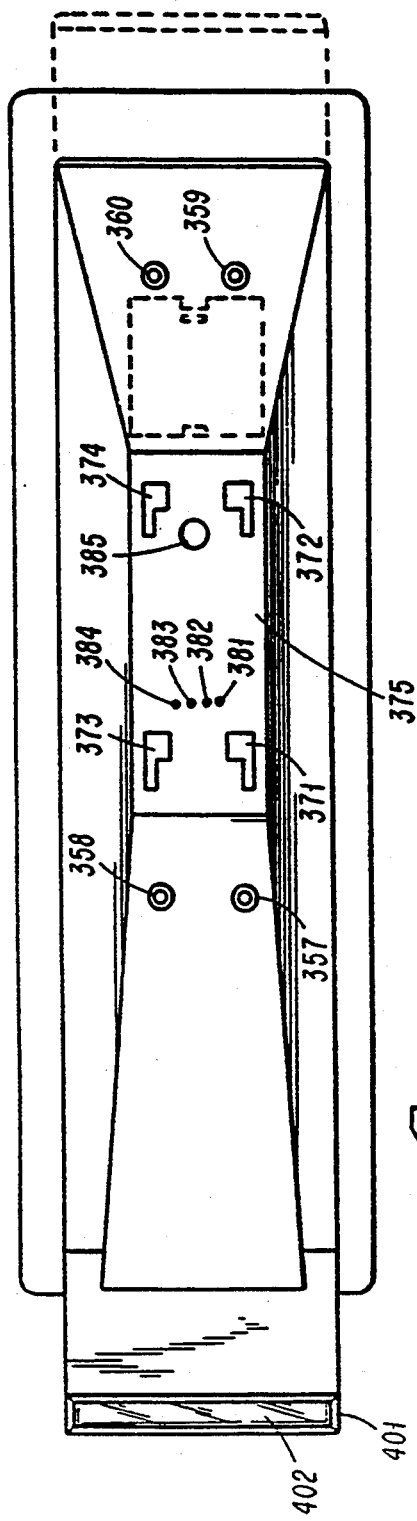
FIG. 15 is a bottom plan view of the scanner body, showing the sealed slots which serve to locate a handle therewith.
Figure 14:
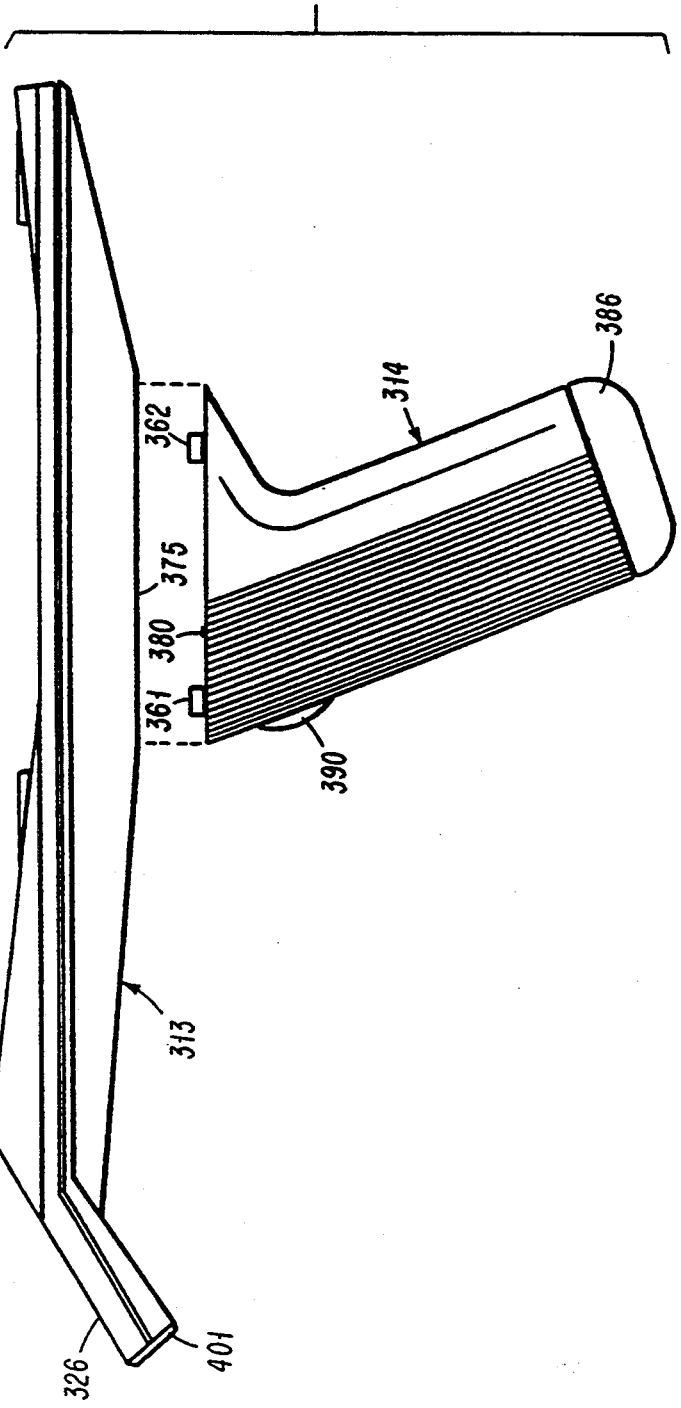
FIG. 14 is a side elevational view of the scanner module of FIG. 13, showing the handle detached but in vertical alignment with its attachment position, and showing locating studs on the handle which fit into the scanner body during assembly therewith.

FIG. 14 shows locating lugs 361, 362 on the handle 314 which interfit with sealed slots 371–374, FIG. 15, at the undersurface 375 of the scanner module 313. Four contacts 380 on the handle 314 mate with respective cooperating contacts 381–384 at undersurface 375, so that for example the handle 314 may optionally contain batteries and supply battery power to scanner module 313. The handle is secured to the terminal by means of an integral internally threaded nut 385 at the undersurface 375 which likewise is sealed off from the interior of the scanner module. Thus elements 371–374 and 385 all present blind holes, so that handle 314 may be omitted without the introduction of any exposed apertures leading to the interior of the scanner module. As a modification, batteries may be removed from the terminal body 311, and all operating power for the scanner and for the terminal keyboard and display and for the RF components may be supplied from batteries in the handle 314.

A slide-off battery cap 386 provides access to the battery compartment within handle 314.

The handle may have a trigger 390 for initiating a scan operation, and two of contacts 380 may serve as part of the scan trigger circuit.

As a modification which may be taken to be illustrated in FIGS. 14 and 15, the terminal batteries may supply all operating power to the RF module 312 and to the scanner module 313, and in this case handle 314 may be omitted to provide a more compact unitary hand-held data capture device.

When handle 314 is omitted, scan trigger actuators may be located at each side of the RF module 312 as indicated at 391, 392, FIG. 16. With this palm supported arrangement, the device may be held in either the right or left hand, and the convenient one of the trigger buttons 391, 392 actuated.

FIG. 15 shows a soft rubber guard 401 surrounding a scanner window 402 which may for example serve as an exit window for scan energy (e.g. light energy) and as an entrance window for return scan energy (e.g. modulated reflected light produced by an incident deflected light beam, or a simultaneous reflected light image where the incident light substantially simultaneously covers the entire data source line or lines such as a complete bar code symbol representing complete product information or the like).

In FIG. 18, center lines 410 and 411 indicate the axes of elements 351–353, 357, 358 and 354–356, 359, 360, FIG. 13, and center line 412 shows the axis of the handle attachment screw which engages nut 385, FIG. 15, to secure the handle 314 in place.

In FIG. 18, the scanner module may omit connector 340 or leave it unconnected electrically. Instead, the scanner module body is provided with an upstanding end part 420 having a set of spring fingers 421 which engage with the respective external contacts 322, FIG. 11, on the adjoining end of the terminal. Again the connections may supply terminal battery power to the scanner module, or handle battery power to the terminal, as well as transmitting the same scanner signals between the scanner module and the terminal as in present types of cable connections between RF terminals and scanners.

As a further alternative scanner power may be supplied by batteries located in a compartment in section 425 of the scanner module.

With batteries in the handle, the center of gravity of the data capture device 310' of FIG. 18 and of data capture device 310 of FIGS. 11–17 may be substantially as indicated at 427, FIG. 18.

Figure 19:
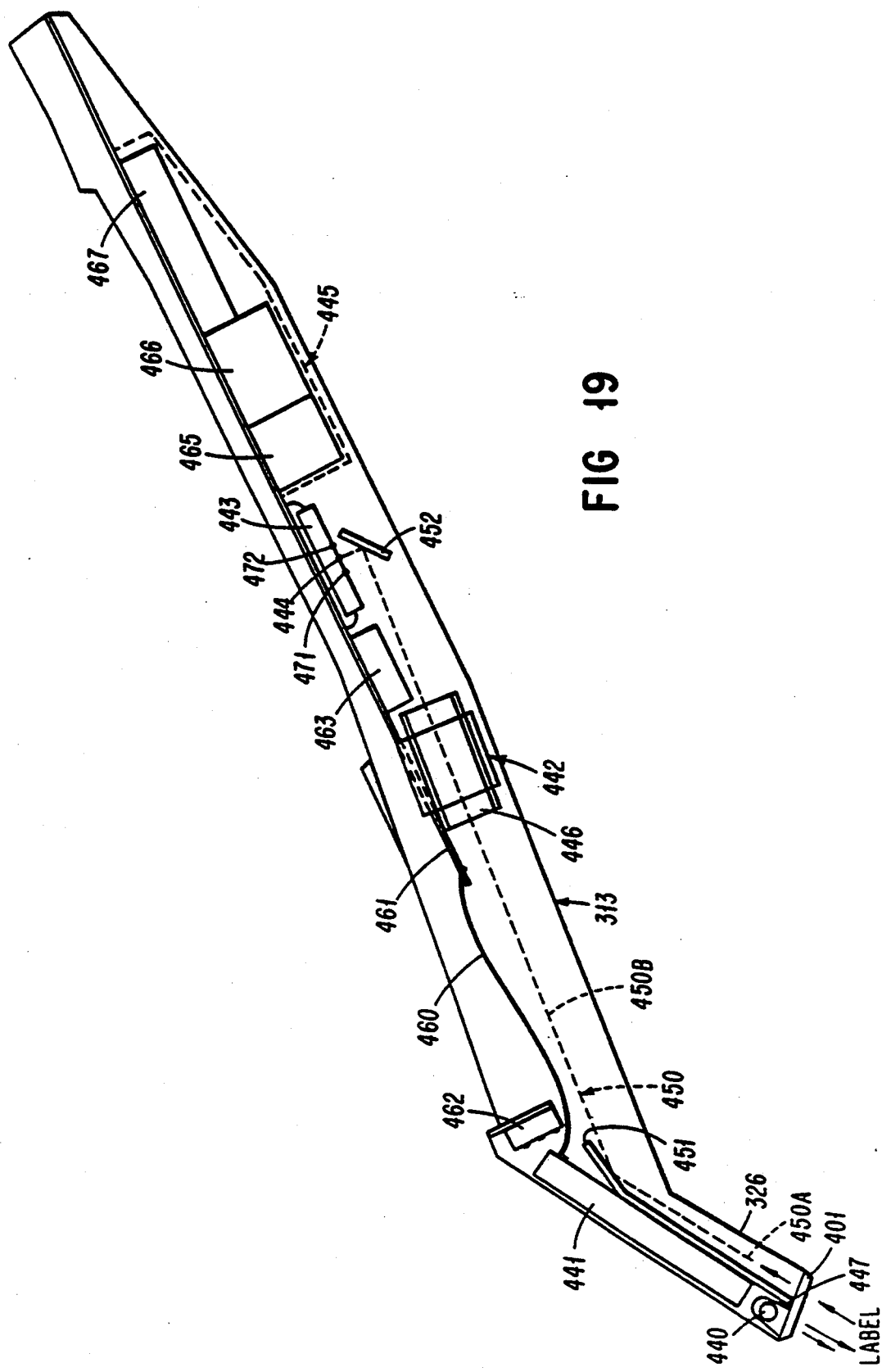
FIG. 19 is a diagrammatic view indicating an exemplary lay-out of parts within the scanner module of FIGS. 11–17 or FIG. 18.

By way of example, FIG. 19 illustrates a layout of parts for the case of a scanner module which illuminates a bar code label or other data source simultaneously over its entire extent, the reflected light image being stored in an image sensor array such as a CCD image sensor array for electronic conversion into a scanner data signal. For example, respective elements of the reflected light image may control the generation of charge in respective sensor elements, the charge states being simultaneously transferred to a shift register for readout as a serial scanner data signal.

A scanner of the reflected light image-image sensor type is shown in U.S. Pat. No. 4,877,949 issued Oct. 31, 1989.

The following tabulation identifies various components shown in FIG. 19 and indicates parenthetically the related reference numerals from the first and third figures of the incorporated U.S. Pat. No. 4,877,949:

Illuminator 440 (15, first figure; 35, third figure)
Illumination Voltage Generator 441 (17, first figure)
Automatic Reading Distance Adaptation Means 442 (20, first figure; 103, 105, 102, 101, 90, third figure)
Image sensor means 443 (11, first figure) with photosensor 444 (13, first and third figures)
Control and Processing Means 445 (10, first figure).

FIG. 19 departs from the showing in the third figure of the referenced U.S. Pat. No. 4,877,949 in having the reflected image follow a single tier longitudinal path 450 in the relatively thin layer-like scanner module body 313. In this way, the thickness of the scanner module body 313 may be substantially less than the thickness of the RF data terminal, for example. The reflected image path is altered by a first mirror 451 and a second mirror 452 so that the image path 450 has a single tier path segment 450A within extension 326 and a single tier path segment 450B within the main section of the scanner module.

To further indicate an exemplary layout of parts, a flex cable 460 may extend from a main circuit board 461 to the illumination voltage generator 441. A sensor driver circuits component 463 may be located adjacent photosensor 443. Control and processing means 445 may comprise sensor control circuits 465, signal detection and shaping circuits 466 and control, communication, and decoding circuits 467. Component 467 may include host I/O buffer means and host connection means (components 121 and 122 of the first figure of U.S. Pat. No. 4,877,949). Label guide indicator means (21, first figure), and intensity sensing means (14, first figure) are indicated at 471, 472 in FIG. 19.

As represented in FIG. 19, and as disclosed in the referenced U.S. Pat. No. 4,877,949, a bar code label or other data source may be read while it is clear of contact with guard means 401 and e.g. at a variable distance therefrom. This is also true with cyclically deflected laser beam scanning systems which may also be contained in scanner modules of the essential configuration of scanner module 313.

In place of the flash tube of the U.S. Pat. No. 4,877,949, a series of bright LED light sources could be used. Illuminator 440, FIG. 19, may comprise one or more flash tubes or one or more series of LED sources.

Where the extension 326 is omitted, or where the extension 326 extends axially of beam path 450B, the mirror 451 is of course omitted. With use of fiber optics or the like in extension 326, the extension 326 could be adjustable e.g. from the orientation shown in FIB. 19 to an in-line orientation aligned with path 450B. A flexible extension 326 could be manually adjusted to any desired position over a range of positions e.g. from the in-line position (with path 450A in alignment with path 450B) to a sharply angled position (e.g. with path 450A forming an angle of one hundred and fifty degrees relative to path 450B).

The Preferred RF Data Terminal-Scanner Configuration of FIGS. 10–19

The RF data terminal 311, 312 as shown in FIGS. 10, 11 and 12 generally may provide the features disclosed in U.S. Pat. No. 4,910,794 issued Mar. 20, 1990 and European Published Patent Application EP/035375-9/A2 dated Feb. 7, 1990. The terminal will run application programs downloaded to it, or permanently stored in it, or combinations of both.

When the radio module 312, FIG. 11, is added to the terminal 311, communication is expanded from direct-wired telecommunication hookups to include real time on-line communication with a host (e.g. a shared data base, applications, etc.). Where the peripheral control card 126, FIG. 10, is used for terminal 311, the radio module itself in the preferred embodiment contains not only the transmitter, receiver, associated level adjusts and the scanner connector 334 direct wired back to the control microprocessor of terminal 311, but also the components 220, 222, 224 and 226 as illustrated in FIG. 10.

The scanner module 313 is treated as an add-on peripheral to terminal 311, governed by the control microprocessor 212, as indicated in FIG. 10.

The handle 314 may contain additional batteries for extended operation, and to lower the center of gravity of the device 310 or 310'. An option would be to remove the batteries of the terminal to further lower the center of gravity of the device 310 or 310'.

The intensity sensing means 471, 472 (see incorporated U.S. Pat. No. 4,877,949) may be used with a series of bright LED sources as illuminator, driven full on until a near saturation of the photosensor is detected, whereupon the LED sources could be turned off, so that they are treated as a single shot light source.

A flex or rigid interface connection may extend between terminal 311 and RF module 312 above the level of sections 335 and 338.

The antenna 104 is offset laterally from connector 334 (FIG. 12) to avoid scanner/antenna electromagnetic interference issues, and may be formed with a right angle bend as at 324, FIG. 16. The length of antenna 104-1 beyond bend 324 may be adjusted to various desired angular positions besides the horizontal disposition shown in FIG. 16. For example antenna element 104-1 may be disposed vertically (as the data terminal is viewed in FIG. 16).

The terminal control microprocessor 212, FIG. 10, controls the supply of battery power to the RF module as represented at 118-1, FIG. 10.

The signal levels transmitted at the interface between the low pass filters 222, 226 of the terminal peripheral board 26, FIG. 9, and the transmit and receive level adjusts 204, 208 of the RF module 106, e.g. if used for RF module 312, FIG. 11, may be standardized to allow terminals and modules to be assembled independently, and then mated in final production, and interchanged in the field, without re-tuning in either case.

The base-band processing circuitry could be located in the RF module as in FIG. 10, and in this case digital signals would be transmitted at the interface 250 between the terminal and the scanner module.

Exemplary scanner technologies which may be used in the scanner modules of the present disclosure include that of U.S. Pat. No. 4,882,476 issued Nov. 21, 1989 and that of U.S. Pat. No. 4,877,949 issued Oct. 31, 1989. The disclosures of U.S. Pat. Nos. 4,877,949 and 4,882,476 are readily applicable to the reading of multiple line bar code indicia. For example, a two dimensional bar code of multiple lines can be envisioned occupying an area of 12.25 square centimeters, e.g. a square with sides of 3.5 centimeters. In accordance with an advantageous development of one of the inventors named herein, marker beams may delineate a field of view of square or circular configuration (e.g. by means of marker beams extending at four corners of a square cross section field of view). The multiline bar code or other area information can be at any random angular orientation within the field of view as delineated by the marker beams, and an area image of the field of view of proper resolution is recorded in a digital image memory, whereupon the digital image may be rotated to a normalized orientation for decoding, for example. While a circular flash tube configuration would be of particular advantage, it is also feasible to utilize linear flash tubes or series of pulse light sources arranged above and below a reader window of suitable configuration, e.g. a rectangular window capable of reading a single line bar code of a length such as five centimeters directly at the reading window, and because of the divergence of the marginal lines (and marker beams) defining the field of view, also capable of reading a single line bar code at any random angle providing the bar code is at a suitable distance from the reader window. The same area reader apparatus would then register a substantial number of line segments of a single bar code as a digital image made up of multiple image lines, or would provide the resolution in orthogonal directions so as to read a multiple line stacked or high density area type bar code pattern of any desired density. A particular advantage of the concepts of modular automatic reader units and modular automatic wireless communication units resides in the ability to adapt these units readily to ever more advanced technological developments, and to adapt the data terminal embodying such modules to a wide diversity of users or applications. For example, modules adapted to different size hands and to left-handed and right-handed users are conceivable. Also various user handicaps could be accommodated.

DETAILED DESCRIPTION OF FIGS. 20-31

FIGS. 20-22 illustrate a modular hand-held data terminal 510 comprised of a user interface terminal portion or module 511 and a hand-held terminal part 512 joining the interface terminal portion along a juncture plane as indicated at 513. The user interface terminal portion 511 may be comprised of a main keyboard 515 having forty-nine manually actuatable selectors, a display 516, and a set of special keys 517 which may have a readily removable label panel 518 associated therewith so that label indicia for the respective keys 517 may be readily changed.

The hand-held terminal part 512 may be comprised of a battery/controller module 521 with a rounded grip-conforming configuration 522 having a hand strap 523 longitudinally spanning the same. The hand strap 523 may be of elastic material and may have hooks 525, 526 which are maintained engaged in receiving blind apertures by virtue of the resiliency of the strap. Module 521 is illustrated as having elongated grooves 531 (FIG. 21), 532 (FIG. 25) which are adapted to receive the fingers of the left or right hand, respectively, when engaged with the grip-conforming configuration 522. As best seen in FIG. 25, module 521 may have a D-subminiature nine pin connector 534 and a further connector 535 which may for example be specifically designed to receive a charger connector of a battery charging unit.

In FIGS. 20-22, the hand-held terminal part 512 may further comprise a radio module 540 having an antenna 541 and a fifteen pin D-subminiature connector 542 which is part of an end cap 543. Module 540 provides a downwardly protruding shoulder portion 549 for engaging the user's hand at one end of grip conforming configuration 522.

FIGS. 23, 24 and 25 illustrate the case where the user interface terminal portion or module 511 of FIGS. 20-22 has been replaced by a substantially wider user interface module 511-1 which is readily attached to the hand-held terminal part 512, FIG. 21, or to the similar hand-held terminal part 512-1 of FIGS. 24 and 25. It will be appreciated that components 515-1, 516-1 and 517-1 of FIG. 23 generally correspond with parts 515, 516 and 517 of FIG. 20, except for differences in size, spacing and arrangement. Module 511-1 is shown as having a protected recess area 550 for accommodating an antenna 541-1 which can be retracted as shown in FIG. 24 so as to be substantially fully protected by the surrounding walls of module 511-1.

FIG. 24 shows the case where the hand-held terminal part 512-1 comprises a peripheral module 540-1 which may include both a wireless communication unit such as a radio transceiver and also an automatic indicia reader unit such as the optical type of full image automatic reader unit as previously described. Module 540-1 is shown as having manually actuatable selectors 551, 552 and 553, preferably of different geometric shape and arranged for actuation by the hand engaging the module 512-1 at 522, 549-1. As shown in FIG. 22, there is preferably a corresponding set of selectors such as 561, 562 on the opposite side of module 540-1, so that the selectors are conveniently actuatable by whichever hand is gripping hand grip portion 522. The strap 523 stabilizes the support of the data terminal during manual actuation of selectors such 551-553. The peripheral module 540-1 may have an optical reader window such as indicated at 402, FIG. 16, for effecting reading of a complete line or multiple complete lines of indicia such as bar code symbols.

FIGS. 26–28 show a different configuration of user interface module 511-2 applied to hand-held terminal part 512 which may correspond identically to that of FIGS. 20–22.

The user interface module 511-2 may have a main keyboard 515 corresponding identically to that of FIG. 20, for example. The width of display 516-2 may however be intermediate the widths of displays 516 and 516-1. In addition to the special keys 517-2 along the lower margin of display 516-2, there is additional a set of manually actuatable selectors 560 along the vertical or Y axis of display 516-2 for example at the right margin. The arrangement of keys 560 facilitates providing software labels for these keys by means of the adjacent portions of the display 516-2, where desired. Where the left hand is engaged with the hand grip portion 522, the strap 523 facilitates the use of the fingers of the left hand to support overhanging portion 564 of the module 511-2 during manual actuation of the keys 560.

The module 511-2 is indicated as including an automatic full line image reader unit 570 which may include an optical window as indicated at 571 which is directed transversely to the longitudal axis of the data terminal. With this type of automatic reader, the data terminal is held edgewise during an automatic reading operation, and then may be turned through about ninety degrees about its longitudinal axis so as to place the user module 511-2 into its normal orientation for user actuation of the keys and for user observation of the display 516-2.

Figure 31:
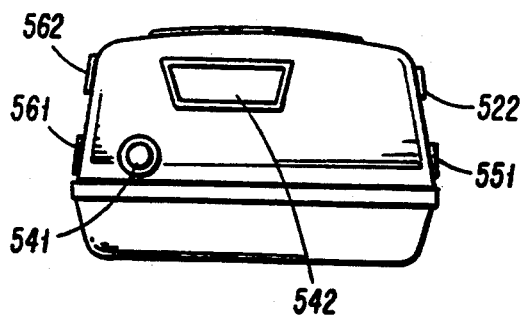
FIGS. 29, 30 and 31 are somewhat diagrammatic plan, side and end views wherein the terminal corresponds with that of FIGS,. 20–22 except that a peripheral module is designed to accommodate a conventional rotary prism laser scanner.
Figure 29:
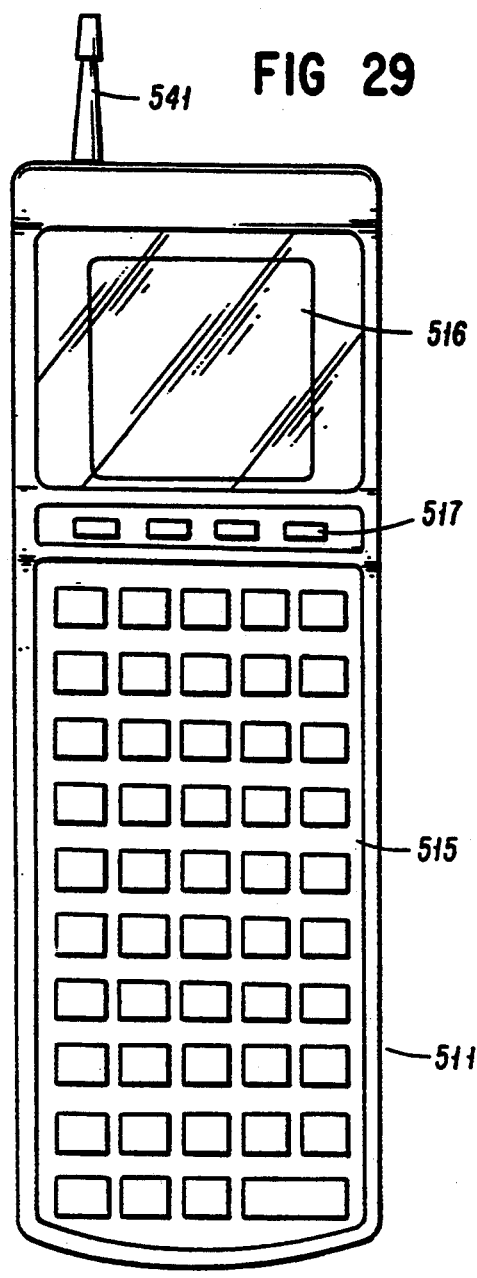
Figure 30:
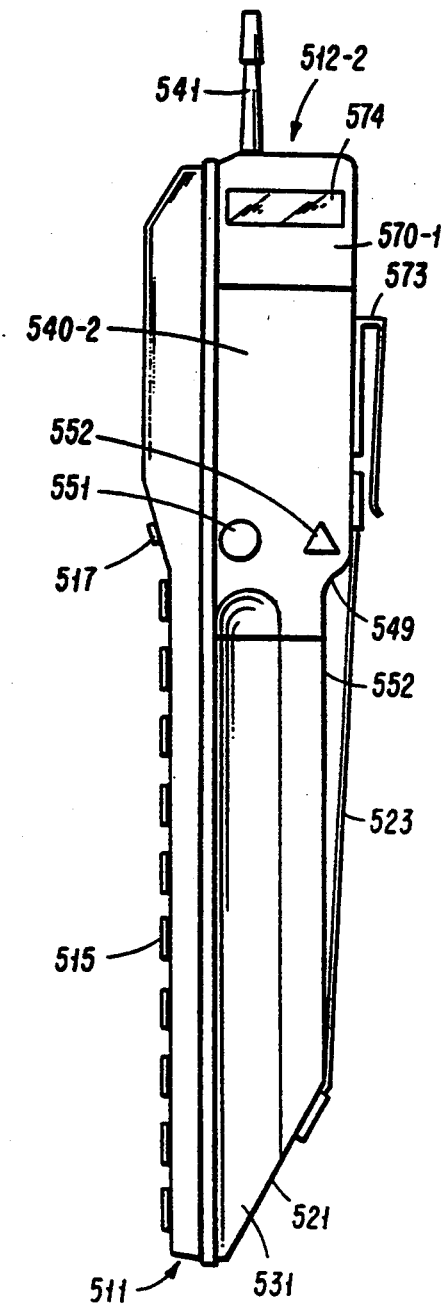

In FIGS. 29–31, modules 511 and 521 may be identical to those described with respect to FIGS. 20–22, for example. Module 540-2 may generally correspond with module 540 except that an automatic reader unit 570-1 is applied as an end cap to module 540-2 in place of end cap 543, FIG. 21. Module 540-2 is shown as having a swivel type belt clip 573 so that the data terminal can be conveniently supported from a belt or the like worn by the user. The automatic reader unit 570-1 may contain an optical window at 574 and may be of configuration so that the data terminal is to be held generally edgewise during an automatic reading operation and then turned through ninety degrees about its longitudinal axis to place the keyboard 515 and display 516 in the optimum orientation for user interaction therewith. By way of example, the optical window 574 may be rectangular and have its long axis substantially parallel to the complete lines of bar code indicia to be read by the automatic reader unit 570-1.

DETAILED DESCRIPTION OF FIGS. 32–37

FIGS. 32–35 show a particularly compact and light weight hand-held data terminal 610 comprising a user interface terminal portion 611 and a hand-held terminal part 612 joined therewith along a juncture plane indicated at 613. The user interface terminal portion 611 in this embodiment may include a keyboard 615 and display 616 generally corresponding to any of the keyboards herein.

Figure 35:
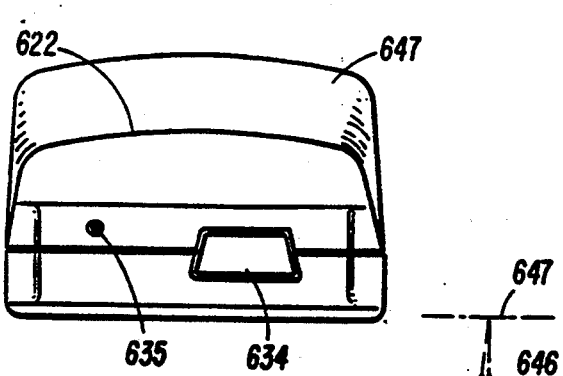

Connectors 634 and 635, FIG. 35, may correspond with connectors 534, 535, FIG. 25, except that in FIG. 35, the connector 634 is associated with printed circuit boards within the user interface terminal portion 611, rather than being associated with modules which provide hand grip portions such as 521, FIGS. 21, 24–25, 27, and 30–31.

The hand-held terminal part 612 may be comprised of a hand grip part 621 and a peripheral module 640. The hand grip part 621 is provided with a grip-conforming configuration 622 which is of longitudinal extent to receive the user's hand and is of a rounded configuration so as to comfortably conform to the user's grip. A battery cover is diagrammatically indicated at 624 for providing access to a battery compartment which may occupy the major part of the space of hand grip portion 621.

The peripheral module 640 may contain automatically operating transducer means comprised of an automatic wireless communication unit and an automatic full image reader unit and thus correspond in this respect with module 540-1 of FIG. 24. The module 640 may be provided with an antenna 641 corresponding with antenna 541 of FIG. 21, or the module 640 may be provided with an antenna corresponding to antenna 541-1 of FIGS. 23 and 24. An optical window is indicated at 642 which may generally correspond with the window 402 of FIG. 16 where the automatic reader unit corresponds to an optical reader unit such as described with reference to FIGS. 11–19. The window 642 may be housed in a reader extension part 643.

Figure 32:
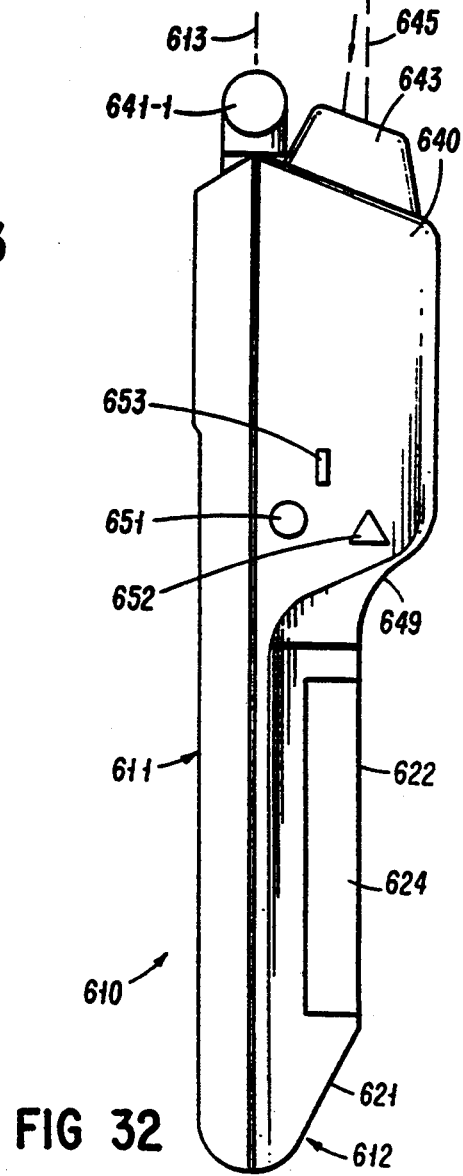

As diagramically indicated in FIG. 32, module 640 may in the usual case for an optical scanner include a source of light energy for directing light energy outwardly through the window 642 along an axis such as indicated at 645 for illuminating indicia such as a complete line or complete lines of bar code symbols on a label or the like lying at any of a substantial range of distances in front of the window 642. By way of example, the label with indicia to be read might lie at an optimum focal plane 646, or might lie in some other plane within the operative range of the automatic reader unit such as the plane arbitrarily indicated at 647. Reflected light energy may travel along a reflected light energy path such as indicated at 648 which passes through the window 642 and into the interior of the module 640 for conversion into a digital video image, for example, as previously described.

Figure 34:
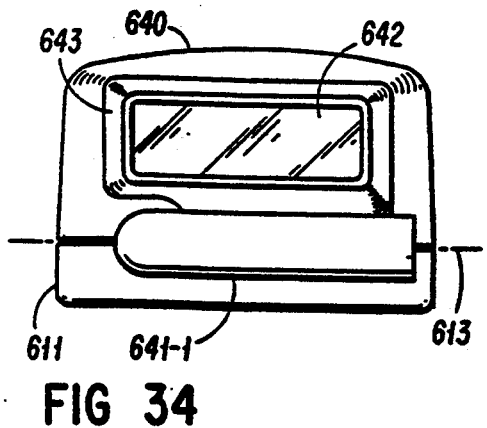
FIGS. 32–35 are side elevational, plan and opposite end views of a further modular terminal configuration in accordance with the present invention.

The antenna 641 may have a right angle bend portion so that the main antenna part may extend transversely as indicated at 641-1 in FIG. 34, and may be rotatable from a horizontal disposition such as shown at 104-1 in FIG. 16 to an upright disposition, for example, (as viewed in FIG. 16).

As seen in FIGS. 32 and 35, module 640 may provide a downwardly curved shoulder portion 649 which may comfortably engage the side of the hand which is in a gripping relation to the hand grip portion 621. A similar shoulder configuration is indicated at 549 in FIGS. 21, 27 and 30, and at 549-1 in FIG. 24.

Manually actuatable selectors such as 651, 652 in FIG. 32 may be located symmetrically on each side of the module 640 and may correspond with selectors such as indicated at 551, 552, 561, 562 of FIGS. 22, 28 and 31.

Figure 33:
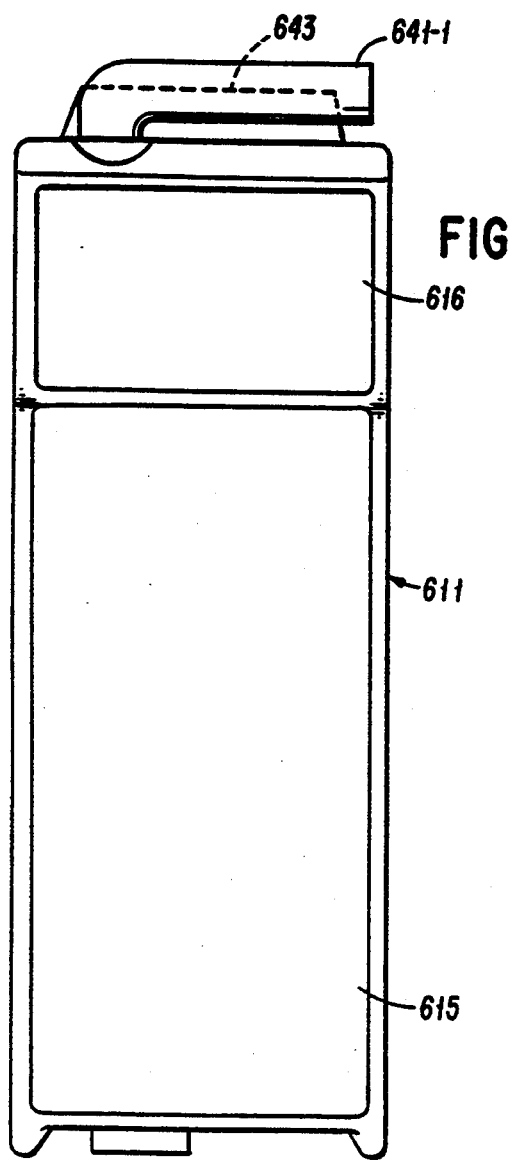
Figure 37:
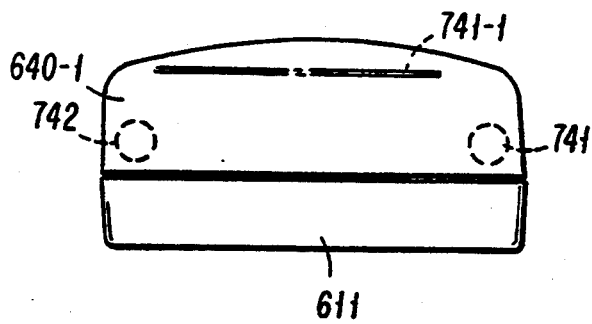
FIGS. 36 and 37 are side and end views showing the basic user interface and battery/control modules of FIGS. 32–35, but with the radio frequency communications/scanner module of FIGS. 32–35 replaced by an RF communications module.
Figure 36:
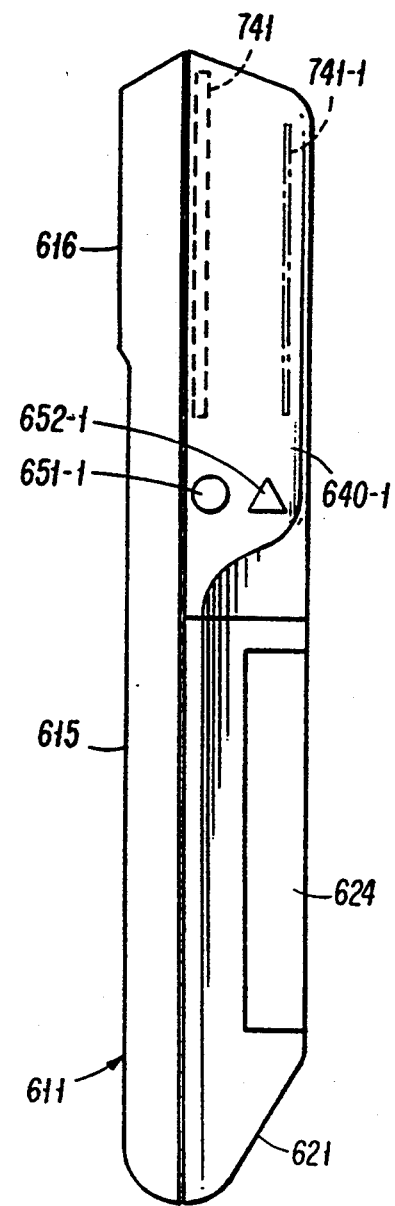

FIGS. 36 and 37 show an identical user interface terminal portion 611 and an identical hand grip terminal portion 621, but show the module 640 replaced by a module 640-1 which may contain only a wireless communication unit such as a radio transceiver. Module 640-1 may have manually actuated selectors such as 651-1, 652-1 symmetrically arranged on the respective sides thereof as in the previous embodiments. In FIGS. 32, 33 and 34, antenna 641-1 is shown as being of the right angle type capable of swiveling from a horizontal position such as shown in solid outline in FIG. 33 to an orientation perpendicular to juncture plane 613, for example. This type of antenna is of course also applicable to FIGS. 36 and 37.

As a further example of antenna location, a pair of antennas may be located as indicated at 741, 742, FIGS. 36 and 37, and these antennas may be of a fixed type covered by the dielectric of the module housing so as to be completely enclosed, or for example, embedded in the dielectric walls of the module so as to be partially exposed. It is also possible that various flat type antenna configurations could be located within the dielectric walls of the module 640-1, for example located as generally indicated at 741-1. The antennas 741 and 742 could also be of the retractable/extendable type as indicated at 541-1, FIGS. 23, 24. All such antenna arrangements are applicable to each of the embodiments herein including the module 640 of FIGS. 32–35.

DISCUSSION RE FIGS. 1–37

As used herein the term "data capture" is intended in a broad sense. For example, in warehousing operations, a data terminal may be used in storing goods in predetermined locations, in collecting a list of items from storage locations, or in transferring incoming product directly to outgoing transport means. In the "put away" mode, the data terminal may be used to automatically read product identifying labels at a receiving dock, and to transmit such identifying data e.g. via an RF link to a host computer. The host computer thereby collects data which has been "captured" by the data terminal, concerning arriving product. The central computer may transmit to the data terminal a list of storage locations where the respective incoming items are to be stored. When items are actually stored, a location label at the storage bin and the product label may be read, and a quantity entered manually at the data terminal to indicate to the host computer the actual change in quantity at the storage location. Again the central computer is collecting data actually "captured" by the data terminal in the course of the relevant activity.

The automatic operations to be performed by the hand-held data terminal are herein termed "data transducing" operations. For example, in an automatic reading operation, product identification and storage location indicia may be read by transforming reflected light information or electromagnetic code impulses (from a so-called RF tag) into data signals corresponding thereto. Similarly in wireless communication data signals within the data terminal are converted to an energy field (e.g. acoustic, inductive, radio frequency or infrared).

A terminal module is a component of a data terminal which is readily removed and readily replaced with the same or different type of component. A detailed example involves components such as 18, FIGS. 1, 2, 5, and 118, FIGS. 6, 7 and 8.

In preferred forms of modules such as 18 (FIG. 5), 118 (FIG. 9), 118-1 (FIG. 10), 311–314 (FIGS. 11–19), 511 (FIGS. 20, 29), 511-1 (FIG. 25), 511-2 (FIG. 26), 521 (FIGS. 21, 24, 27, 30), 540 (FIGS. 21, 27), 540-1 (FIG. 24), 540-2 (FIG. 30), 640 (FIG. 32), 640-1 (FIG. 36), the corresponding modules have quick-connect, quick disconnect coupling means exclusively, such as coupling means 38, 39, 22, 23, 67, 68 (FIGS. 2, 5), 86, 87 (FIG. 2), 122, 123 (FIG. 8), 322 (FIG. 11), 334, 340 (FIGS. 12, 13), 351–356 (FIG. 13), 361, 362, 371–374 (FIGS. 14, 15), and 420, 421 (FIG. 18). The quick action coupling means may be based on self aligning pin and socket type electric or optic connectors where parts interfit when within the tolerance range of the guiding parts (such as 38, 39, FIG. 5) or may involve directly engaging surface contacts, or various optical or inductive couplers that merely require alignment within the tolerance range. Preferably also all such modules are readily removed and replaced in the field by the end user, with the use at most of simple hand tools, and with standardized interface levels such that no tuning adjustments or the like are required. A preferred type of module can readily be disconnected, removed as a unit, and replaced with a spare or a different type part. The preferred type of module has defined performance characteristics which permit it to be tested and adjusted as a separate unit, prior to assembly with other terminal components.

Certain of the modules herein are disclosed as being capable of operation separately from other normal components of the data terminal. For example, end cap modules 18, 118, and 118-1 may be replaced with a simple cover piece which omits connector 19 and all internal parts except e.g. guides 38, 39 (FIG. 5). In FIG. 11, modules 311 and 313, 314, or 313 alone may have their own batteries (e.g. at 337, and at 314, FIG. 11, and at 425, FIG. 18). Module 313 has a hand grip region at 375 by which module 313 can be held in the absence of modules 311 and 314. Modules 311, 312, 313 can be held at 375, 62, in the absence of module 314, and may have individual battery power at 337, 425, or either battery location may supply operating power for all of the modules. Similarly modules such as 511, 511-1, 511-2 may contain battery compartments capable of containing batteries which enable separate operation of such modules. A dummy hand-grip module 521 without batteries in its battery compartment may serve the mechanical function of a hand grip only. For example, module 511-1 may contain a wireless communication unit associated with antenna 541-1 and operated from its own battery power, or battery power from module 521, with peripheral modules such as 540, 540-1, and 540-2 all omitted. Thus the modules of FIGS. 20–31 are preferably essentially completely enclosed and themselves protected from electrostatic discharge, dust, moisture and other contaminats, e.g. to facilitate storage, handling, and separate use as here described.

An automatic reader such as 570, FIG. 26, may be operable as part of module 511, 511-1 or 511-2, from battery power within this module or from handle module 521, in the absence of any peripheral module such as 540, 540-1 or 540-2. A wireless communication unit connected with antenna 541-1 may be associated with such a single module or two module system. Alternatively, the interface module or the handle module could contain extensive memory, facilitating batch operation of the one or two module systems.

The hand-held terminal parts 512, 512-1, 512-2 may also operate entirely separate from the user interface terminal module 511, 511-1, 511-2. For example the peripheral module 540, 540-1, 540-2 is already shown as containing manually actuatable selectors such as 551–553, 561, 562, which may act as manual data input/function selector means. Additional user interface means may include use of marker beams of the automatic reader unit which may flash distinctively or in different colors to signal a good or bad read. A sound generator may generate various tone patterns to communicate with the user as to mode selected, good read, etc. Further, modules 540, 540-1, 540-2 may contain voice recognition and/or voice synthesis devices to facilitate user supervision of the terminal parts 512, 512-1, 512-2. Such voice input/output interface means may be located on the side face of module 540, 540-1, 540-2 opposite the reader optical window such as 571 or 574, so that the orientation of the terminal part during automatic reading is essentially identical to the normal orientation which is optimum for user interaction with the voice recognition input and with the voice synthesis output of the module. That is the input microphone and output loudspeaker would be directed toward the user, while the optical window such as 571 or 574 would be directed away from the user, the longitudinal axis being generally vertical, and the juncture plane generally bisecting the user, and being generally at right angles to the plane of a label being read.

Modules such as 511, 511-1, 511-2 when self powered, may be constructed so that their coupling means (e.g. acoustic, infrared, inductive, etc.) are operable e.g. directly across the juncture plane 513 in the full data terminal configuration, and also at various distances from the hand-held terminal part 512, 512-1, 512-2. Such an arrangement is advantages where the interface part 511, 511-1, 511-2 can be conveniently mounted on a goods transport device while the user may leave the transport device to actually handle products being collected or put away. With the strap 523, the part 512, 512-1, 512-2 can be carried at the wrist or forearm with both hands free when needed. The module 511, 511-1, 511-2, can display a put away list of items and locations, or a pick list of goods to be collected and locations thereof, and be referred to when the operator returns to the transport device.

The grooves 531, 532 may facilitate mounting the complete data terminal or terminal part 512, 512-1, 512-2 in a holder which may provide two ribs designed to engage in the respective grooves, and to rest against the end walls 531A, 532A at the upper ends of the grooves. The hand strap 523 may be compressed toward hand grip 522 as the part 512, 512-1, 512-2 is lowered into such a holder e.g. where the holder is affixed to a belt on the user's waist. The different width modules 511, 511-1, 511-2 are not a problem (as they would be with an enclosing holster type carrier).

A docking system for receiving terminal part 512, 512-1, 512-2 for recharging of batteries, and data uploading to a host and/or data or program downloading to the terminal may similarly have ribs designed to engage in the respective grooves 531, 532.

It is also conceivable to provide the user interface terminal module 511, 511-1, 511-2 with blind undercut slots or blind keyhole type slots for receiving the hooks 525, 526 or other end fittings of a resilient hand strap 523 when module 511, 511-1, 511-2 is separate from part 512, 512-1, 512-2. In this way, the module 511, 511-1, 511-2 may be worn on one wrist or forearm so as to face the user, while the terminal part 512, 512-1, 512-2 is worn on the other wrist or forearm in a disposition where an automatic reader such as 570 or 571-1 is ready for use. Again both hands can be available for the safe lifting of relatively heavy items to be stored, collected or transferred. A voice recognition unit may conveniently control automatic reading operation and/or the reader may have a pulsed proximity detector for measuring distance and for automatically effecting a reading operation when a label is within the operative reading range. Pulsed marker beams can be used to assist the user in keeping the label within the field of view once the distance measurement system is enabled until a valid reading has been obtained.

With automatic reader units such as 570 and 570-1 which are directed laterally, it may be desirable to accommodate users who would desire to hold part 512, 512-2 with the right hand and actuate selectors 515, 517-2, 560 with the left hand. To this end, module 511-2 could be replaced with a module where window 571 was directed laterally to the left (as the user interface is to be viewed in FIG. 26), and overhang 564 and keys 560 were laterally to the left of part 512.

In an arrangement such as indicated in FIG. 30, module 540-2 could be replaced with a module having a reader optical window directed in the opposite lateral direction from window 574, and e.g. an antenna on the opposite lateral side of the module from antenna 541, FIG. 31.

As a further alternative, antenna 541, FIG. 31, could be rearranged as described with reference to FIG. 32, and as shown at 741, 742 or 741-1, FIGS. 32, 34, to permit end cap 570-1 to form a separate module which may engage with module 540-2 in either of two opposite orientations, one as shown in FIG. 30, and the other with optical window 574 directed in an opposite sense. The module 570-1 may contain its own battery, decoder and communication interface for serial communications of decoded bar code data signals over a central optical interface channel which is aligned with a cooperating optical channel of module 540-2 in either orientation of module 570-1.

In another conceivable embodiment, a base section of a reader module e.g. containing batteries, decoder and communications interface could plug into a connector such as 542, carried by a peripheral module at 540-2. The reader module base would occupy the space of reader unit 570-1 prior to window 574. The reversible part of the reader module would e.g. have a coiled cable secured with the base section so as to accommodate either of the opposite orientations of the window of the reversible part of the reader module.

Any of the terminals or terminal parts with automatic reader modules could be clipped to the user's belt and used as hands free readers. A clip such as 573, FIG. 30, could mount terminals such as shown in FIGS. 27 and 30, with the longitudinal axis vertical, and could mount module 313 (without handle 314 or modules 311, 312) with the juncture plane vertical and the longitudinal axis horizontal. Similarly, a belt clip such as 573 or two such clips could mount terminal 610, FIG. 32, with its juncture plane 613 vertical, so that reading axis 645 would be directed toward a work area in front of the user. An angularly adjustable extension such as described for extension 326 could adjust the field of view to conveniently impinge on the work area.

Pulsed marker beams would facilitate the user's positioning of successive items, and distinctive sounds, marker beam flashes or colors, etc. could signal a successful read of each successive item. As previously mentioned the reader module could operate in a proximity detect mode. The data terminal could emit a distinctive sound whenever a label came within the field of view and within an appropriate range of distances, and actual reading would take place automatically (during an interval when all marker beams were off). The marker beams could be pulsed automatically only when an acoustic proximity detector sensed that a label was in alignment with the field of view, so as to conserve battery energy during such hands free operation of the reader unit, if desired.

Any of the displays herein may be capable of presenting any arbitrary graphical display, e.g. individual handwritten signatures, so that a person's signature can be compared with an authorized signature stored in the data terminal and displayed on the terminal display.

Furthermore the displays herein may incorporate high resolution digitizers. Where the digitizer is transparent, the digitizer field may be superimposed over the display layers. Signatures may be captured on a stroke sequence basis for dynamic comparison with a stored authentic signature. Pressure variations may also be stored and compared. See for example U.S. Pat. No. 4,793,810 issued Dec. 27, 1988, and U.S. Pat. No. 4,798,919 issued Jan. 17, 1989.

A combined digitizer/display is shown for example in U.S. Pat. No. 3,764,813 issued Oct. 9, 1973. This digitizer avoids the use of touch wires which would tend to obstruct the displayed information. It is apparent that a square digitizer/display, for example, may use angularly swept light beams e.g. at the four corners each sweeping the digitizer area. By using a square array of photosensors for following the successive sweeps, the stylus location could be accurately tracked. With multiple layers of photosensors, stylus pressure could also be recorded. Stepping motors, for example, could be used to sweep the light sources through ninety degrees clockwise during one scan, and then through ninety degrees counterclockwise for the next scan at each corner. Each laser source may be pulsed on and off after each step of its stepping motor, and the stepping actions of the respective motors may be sequentially offset to minimize the interval between pulsing of the successive laser sources. Arrays of photodetectors along the sides of the digitizer area could have single outputs since the pulsing of the laser sources would indicate the time when the absence of an output pulse represented a beam obstructed by the stylus. The production of rectangular cross section beams of good resolution over a substantial working distance and the cyclical deflection of such beams are familiar to those in the field of laser bar code scanners, so that two or more laser sources would be sufficient for sensing both area position and contact pressure.

The user interface means of any of the embodiments herein or replacement user interface modules may provide for handwritten printing or cursive data input including provision for signature capture and verification.

The optical full image automatic reader units disclosed herein or provided by replacement modules may have resolution to capture automatically a complete signature written on a delivery receipt or the like for digital storage and automatic validation based on a digitally stored authentic signature.

Where the marker beams are only active when an acoustic range finder signals that a target is within range and generally in the field of view, a central aiming visible light beam may be pulsed whenever the acoustic range finder is active, to facilitate aiming of the optical reader. When the target is within range, the aiming light beam is de-activated to save battery power, and flashing of the marker beams begins to facilitate bringing the multiple lines of indicia into the area field of view. The marker beams may diverge according to the increasing size of the field of view with increasing distance to more precisely delineate the field of view.

The aiming visible light beam is also useful with directional type RF-tag systems, e.g. systems operating at relatively high frequencies. The flashing of the aiming light may be terminated automatically as soon as a valid reading has been obtained.

With signature verification, and also with bar code reading of bar codes at random angles, the digital image obtained can be displayed on a display of the terminal along with a normalization line. The operator can rotate the normalization line with a manual control to indicate any pronounced slant of the signature or to indicate the angle of a single or multiple bar code stored image. The processing program can rotate the stored image, and display the normalized signature or bar code image prior to validation processing or decoding.

A bar code image can automatically be normalized before decoding for example, by detecting linear segments of memory cells which all represent dark pixels, and thereby establishing the slope of the bars of the bar code. Such an algorithm can be designed to quickly locate a dark bar as a first step. For example, a digital memory may contain a bar code image representing a bar code three centimeters long by 1.7 centimeters tall, and within an area field of view four centimeters by four centimeters. By exploring horizontal lines of memory cells at one centimeter intervals and then exploring vertical lines of memory cells at one centimeter intervals, a given line of memory cells could be identified with the largest number of black pixels, (e.g. each assigned a value of one). By selecting a sequence of black cells along the selected line, and exploring memory cells on each side of the selected line, the probable slope of a given black bar could be quickly ascertained. A check would be to examine a set of memory cells along a line at right angles to the probable slope of the bars. If such a line encountered the proper number of bars, the digital image could be rotated according to the probable slope value. A refinement would be to select a sequence of black cells along the selected line closest to the minimum bar width since the slope of a minimum width bar is more accurately determined in a minimum of steps. Once the bars were approximately vertical in memory, spaced horizontal lines of memory cells could be examined, and further rotational correction could be effected if desired.

If several spaced lines of memory cells did not render the same bar code number, once the bar code image was normalized, the image could be discarded, and a further image examined. Voice synthesis means could instruct the user to aim the automatic reader up or down, left or right, if the bar code image was found to be only partly registered in image memory.

It will be apparent that features of the various embodiments illustrated or described herein may be combined, and that various of the features may be utilized independently of others, and that many further modifications and variations may be effected without departing from the scope of the teachings and concepts of the present disclosure.

We claim:

1. In a data capture system, a hand-held data terminal of size and weight to be held in one hand during use, said data terminal being of the type comprising:
   (a) a user interface terminal portion having user interface means providing for user interaction with the data terminal in the supervision of data capture operations, (b) data transducing means for reading at least a full line of indicia automatically from an external medium to generate data signals, and to wirelessly transfer data signals between the data terminal and an external host, (c) control means operatively interconnected with the user interface means and with said data transducing means for controlling data capture operation of the data terminal under user supervision, and (d) portable power supply means for powering the data terminal; said data capture system being particularly characterized in that:

a terminal module or modules contains said data transducing means, and consequently contains an image reader unit operative to read at least one full line of indicia without requiring manual movement of the data terminal, and also contains a wireless communication unit for the wireless transfer of data signals, said terminal module or modules being replaceable with respect to said data terminal.

2. In a data capture system according to claim 1, said hand-held data terminal having a normal user operating orientation during user interaction with said user interface means, with the user interface means generally facing toward the user, and said hand-held data terminal having a normal reading disposition during a reading operation of said full image reader unit which essentially corresponds with said normal user operating orientation so as to accommodate rapid transitions between reading operation and user interaction with the user interface means without requiring radical changes in the manually held disposition of the data terminal.

3. In a data capture system according to claim 1, said hand-held data terminal being formed of terminal modules forming longitudinally extended layers separated at a juncture plane, the user interface means being in a longitudinally extended layer at an upper side of the juncture plane in normal user operating orientation of the user interface means, and said full image reader unit being directed generally forwardly and away from the user in said normal user operating orienation so as to be essentially in a normal reading disposition.

4. In a data capture system according to claim 1, 2 or 3, said user interface means comprising a manually actuatable selection unit extending from a proximal end procimate to the user during user interaction therewith, to a distal end relatively more remote from the user, said data terminal having a hand grip portion substantially underlying the distal end of the manually actuatable selector unit and supporting the manually actuatable selector unit during manual actuation thereof.

5. In a data capture system according to claim 4, said hand grip portion having a rounded grip-conforming configuration so as to be comfortably embraced by the user's hand.

6. In a data capture system according to claim 5, a hand strap spanning longitudingly across the rounded grip-conforming configuration for backing the hand supporting said data terminal.

7. In a data capture system according to claim 4, a modular housing containing said data transducing means and providing a downwardly protruding shoulder at a forward side of the hand grip portion.

8. In a data capture system according to claim 1, 2 or 3, said wireless communication unit being removable and replaceable without requiring tuning adjustments.

9. In a data capture system according to claim 8, said control means coupled by a connector means across a digital interface to control said wireless communication unit, the signals passed over said connector means being of standardized logic levels such that said wireless communication unit is removable and replaceable without requiring tuning adjustments.

10. In a data capture system according to claim 1, 2 or 3, said user interface terminal portion forming a hand-held data terminal unit readily separable in its entirety from said data transducing means, and being capable of effecting manual data capture operations as a separate hand-held entity.

11. In a data capture system according to claim 1, 2 or 3, a common transducer housing containing said full image reader unit and said wireless communication unit, said common transducer housing being readily detachable from the user interface terminal portion.

12. In a data capture system according to claim 11, said control means comprising decoder means also contained in said common transducer housing for decoding data signals received from said full image reader unit and for supplying decoded data signals to said wireless communication unit for transfer to an external host.

13. In a data capture system according to claim 1, 2 or 3, said control means, and said portable power supply means together with said data transducing means being readily separable from the user interface terminal portion.

14. In a data capture system according to claim 13, a hand-held terminal part containing said control means, said portable power supply means and said data transducing means and being operable entirely separate from said user interface terminal portion for reading of indicia from an external medium and for wireless transfer of data signals to an external host.

15. In a data capture system according to claim 14, said hand-held terminal part having a hand grip portion for manual support thereof and for use in manually directing said full image reader unit into registry with at least a full line of indicia to be read during data capture operation separate from the user interface terminal portion.

16. In a data capture system according to claim 15, said hand-held terminal part having manually actuated selector means in proximity to the hand grip portion for manual actuation by the hand supporting the hand grip portion so as to control the reading of indicia and the wireless transfer of data signals, while the hand-held terminal part is entirely detached from the user interface terminal portion.

17. In a data capture system according to claim 14, said hand-held terminal part having voice synthesis means for interacting with the user to facilitate user supervision of the operation of said data transducing means.

18. In a data capture system according to claim 14, said hand-held terminal part having voice recognition means for responding to user verbal instructions to facilitate user supervision of the operation of said data transducing means.

19. In a data capture system according to claim 1, wherein said hand-held data terminal further comprises a housing, each terminal module comprising a housing portion, which acts with the remainder of said housing to form said housing when said terminal module is replaced with respect to said data terminal.

20. In a data capture system, a hand-held data terminal of size and weight to be held in one hand during use, said data terminal being of the type comprising
   (a) user interface means providing for user interaction with the data terminal,
   (b) data transducing means for transducing data signals in the furtherance of data capture operations,
   (c) control means operatively interconnected with the user interface means and with said data transducing means for controlling data capture operations of the data terminal, and
   (d) portable power supply means for powering the data terminal; wherein said data capture system further comprises:
   at least three terminal modules, each module of said three modules receiving selected of said means (a)–(d) and being selectively displaceable and replaceable to form said hand-held data terminal, a first terminal module extending longitudinally in a first layer and having a length generally comparable to the overall length of the data terminal, and second and third terminal modules extending longitudinally and having aligned longitudinal axes, said second and third terminal modules lying generally in a second layer adjoining said first terminal module along a juncture plane which is located between said first terminal module, and said second and third terminal modules.

21. In a data capture system according to claim 20, said first terminal module having data transducing means therein and forming a platform for support of the second and third modules along said juncture plane.

22. In a data capture system according to claim 20, said first terminal module having a hand grip portion which when gripped by the user supports the data terminal with the user interface means directed toward the user.

23. In a data capture system according to claim 20, said second terminal module including said user interface means and being capable of operation in conjunction with said user interface means as a manually controlled data terminal unit when entirely separate from said first terminal module.

24. In a data capture system according to claim 20, said second and third terminal modules having said user interface means and having a wireless communication unit as operative parts thereof such that the second and third terminal modules are operative entirely separate from the first terminal module, as a data terminal unit capable of wireless communication with a remote host.

25. In a data capture system according to claim 20, 21, 22, 23, or 24, said third terminal module containing a wireless transceiver unit, and said third terminal module being removable and replaceable as a unit.

26. In a data capture system according to claim 25, said third terminal module being removable and replaceable without requiring any tuning adjustment.

27. In a data capture system according to claim 20, said first terminal module comprising said user interface means and being removable and replaceable as a unit.

28. In a data capture system according to claim 27, said first terminal module having a substantially greater width than said second and third terminal modules and being replaceable with a first terminal module unit of substantially different configuration to form a data terminal unit with different user interface characteristics.

29. In a data capture system according to claim 28, said second terminal module having a grip-conforming configuration so as to be comfortably gripped by one hand during operation of the data terminal.

30. In a data capture system according to claim 29, said user interface means comprising manually actuated selector means having a greater width than said second terminal module, said second terminal module having a hand strap at the underside thereof longitudinally spanning said grip-conforming configuration such that the user can spread his hand which is backed by the hand strap to support a portion of the manually actuated selector means at a lateral margin thereof not directly supported by the second terminal module.

31. In a data capture system according to claim 20, said first terminal module having display means with manually actuated selector means at a lateral margin thereof laterally offset from an underlying portion of the remaining terminal modules, the remaining terminal modules providing a grip-conforming configuration for receiving the user's hand in supporting relation thereto and having a hand strap longitudinally spanning said grip-conforming configuration such that the user can spread his hand which is backed by the hand strap to support the manually actuated selector means at the lateral margin during manual actuation thereof.

32. In a data capture system according to claim 20, said first terminal module comprising said user interface means, said second and third terminal modules providing a hand-held terminal part underlying said first terminal module in normal user operating disposition of said first terminal module, said hand-held terminal part having a symmetrical hand grip portion suitable for comfortable gripping by the right or left hand.

33. In a data capture system according to claim 32, said hand-held terminal part having manually actuated selectors at the respective sides thereof suitable for actuation by the hand associated with said hand grip portion.

34. In a data capture system according to claim 33, said hand-held terminal part having a hand strap longitudinally spanning the hand grip portion for stabilizing the support of the hand-held terminal part during selective actuation of the manually actuated selectors.

35. In a data capture system according to claim 20, said first terminal module comprising a keyboard for disposition proximal to the user during use thereof and a display more remote from the user, said second and third terminal modules providing a hand-held terminal part with a hand grip portion underlying said keyboard.

36. In a data capture system according to claim 20, said third terminal module having a reader for reading indicia remote from the user while the data terminal is in a reading orientation, said first terminal module comprising said user interface means and having a normal user operating orientation during user interaction with said user interface means which essentially corresponds with said reading orientation.

37. In a data capture system according to claim 20, said transducing means comprising a full image reader extending along the juncture plane and being directed transversely to the longitudinal axes of the terminal modules such that during a reading operation the junction plane is disposed generally transversely to the plane of indicia to be read.

38. In a data capture system according to claim 37, said first terminal module comprising a keyboard for disposition proximal to the user during manual operation, a display for disposition remote from the user, and having said full image reader disposed at a remote margin of the display remote from the user.

39. In a data capture system, a hand-held data terminal of size and weight to be held in one hand during use, said data terminal being of the type comprising
   (a) user interface means providing for user interaction with the data terminal,
   (b) data transducing means for reading data code indicia to generate data signals indicative thereof,
   (c) control means operatively interconnected with the user interface means and with said data transducing means for controlling data capture operations of the data terminal, and
   (d) portable power supply means for powering the data terminal; wherein said data capture system further comprises:
   said user interface means extending longitudinally in a first layer and constructed for modular attachment with said data transducing means lying in a second layer on an opposite side of a juncture plane from said user interface means.

40. In a data capture system according to claim 39, said hand-held data terminal having a normal user operating orientation during user interaction with said user interface means, with the user interface means generally facing toward the user, said data transducing means comprising a full image reader unit, and said hand-held data terminal having a normal reading disposition during a reading operation of said full image reader unit which essentially corresponds with said normal user operating orientation so as to accommodate rapid transitions between a reading operation and user interaction with the user interface means without requiring radical changes in the manually held disposition of the data terminal.

41. In a data capture system according to claim 40, said user interface means being in a longitudinally extended layer at an upper side of said juncture plane in normal user operating orientation of said user interface means, and said full image reader unit being directed generally forwardly and away from the user in said normal user operating orientation so as to be essentially in a normal reading disposition.

42. In a data capture system according to claim 40 or 41, said user interface means comprising a manually actuatable selection unit extending from a proximal end proximate to the user during user interaction therewith, to a distal end relatively more remote from the user, said data terminal having a hand grip portion substantially underlying the distal end of the manually actuatable selector unit and supporting the manually actuatable selector unit during manual actuation thereof.

43. In a data capture system according to claim 42, said hand grip portion having a rounded grip-conforming configuration so as to be comfortably embraced by the user's hand.

44. In a data capture system according to claim 43, a modular housing containing said data transducing means and providing a downwardly protruding shoulder at a forward side of the hand grip portion.

45. In a data capture system according to claim 39, 40 or 41, said data terminal comprising a wireless communication unit, said wireless communication unit being removable and replaceable without requiring tuning adjustments.

46. In a data capture system according to claim 45, said control means coupled by a connector means across a digital interface to control said wireless communication unit, the signals passed over said connector means being of standardized logic levels such that said wireless communication unit is removable and replaceable without requiring tuning adjustments.

47. In a data capture system according to claim 39, 40 or 41, said data transducing means comprising a full image reader unit and a wireless communication unit, a common transducer housing containing said full image reader unit and said wireless communication unit, said common transducer housing being readily detachable from said user interface means.

48. In a data capture system according to claim 47, said control means comprising decoder means also contained in said common transducer housing for decoding data signals received from the automatic full image reader unit and for supplying decoded data signals to said wireless communication unit for transfer to an external host.

49. In a data capture system according to claim 1, 20 or 39, said data transducing means being capable of reading an area image and having comparable resolution in respective orthogonal directions over its area field of view, and providing marker beams for delineating the area of the field of view at different distances from said data transducing means.

50. In a data capture system according to claim 49, the marker beams being pulsed to conserve battery power.

51. In a data capture system according to claim 50, a range finder controlling pulsing of the marker beams such that the marker beams are pulsed only when a label is within the operative range of the transducing means.

52. In a data capture system according to claim 51, the range finder when enabled providing a pulsed visible light beam for indicating the aiming direction of the transducing means.

53. In a data capture system according to claim 1, 20 or 39, said user interface means comprising digitizer and display means capable of digitizing and displaying a person's signature.

54. In a data capture system according to claim 53, said digitizer and display means providing a common working surface for receiving a stylus impression according to an input signature, and for displaying a stored signature.

55. In a data capture system according to claim 1, 20 or 39, said data transducing means comprising a full image reader unit capable of optically reading a person's signature and storing a digitized version of such signature.

56. In a data capture system according to claim 55, said data terminal comprising memory means for storing valid signature records and to evaluate the authenticity of a signature read by said reader unit.

57. In a data capture system,
   a data terminal of size and weight to be held in one hand in a normal user operating orientation, and having a frontal side providing user interface means accommodating user interaction with said data terminal,
   said data terminal comprising a terminal module providing said user interface means at the frontal side of said data terminal and having an underside opposite said frontal side, and accommodating modular attachment therewith, and
   removable and replaceable code scanner module means for directing radiation on and reading reflected radiation from a complete code symbol without relative movement of the code symbol and said scanner module means, and having an upper side in mating engagement with said underside of said terminal module to form a unitary hand-held data capture device, with independent means for transmitting code data from said code scanner module means to said terminal module, said code scanner module means being removable as a unit from said terminal module, said terminal module and said code scanner module means so arranged that when disposed in said mating engagement with each other and held in said normal user operating orientation, said terminal module and its user interface means is oriented for unobstructed viewing and convenient interaction by the user and said code scanner is simultaneously oriented by the orientation of said terminal module for scanning the code symbol.

58. In a data capture system according to claim 57, a modular handle detachably secured to said data terminal such that a user grasping said handle supports said data terminal with said user interface means directed upwardly so as to be conveniently accessible to the user.

59. In a data capture system according to claim 58, said data terminal being constructed so that when said data terminal is held by a user in its normal user orientation, said user interface means lies in a horizontal plane and is directed upwardly to be readily accessible to the user, and said code scanner module means is directed generally forwardly from the user and downwardly.

60. In a data capture system according to claim 59, said code scanner module means having a scanner window, and light source means for directing the radiation in the form of light energy through said scanner window so as to substantially instantaneously read a complete code symbol while said user interface means remains essentially stationary in a horizontal plane and accessible to convenient user interaction.

61. In a data capture system according to claim 57, said data terminal being of configuration so as to be palm supported with one hand, said data terminal having manually actuated triggers at opposite lateral sides thereof such that said code scanner module means is readily triggered to effect a code scanning operation by either a right or left hand of the user the palm of which is disposed in supporting relation to said data terminal.

62. In a data capture system, a data terminal of size and weight to be held in one hand during use, said data terminal comprising a terminal module having a frontal side providing user interface means accommodating user interaction with said data terminal, said terminal module having an underside opposite said frontal side, and accommodating modular attachment therewith, and data source scanner module means operative during a scanning operation for scanning essentially instantaneously a complete data source, said scanner module means having an upper side mated with said underside of said data terminal module to form a unitary hand-held data capture device, said unitary hand-held data capture device being manually held in a normal user disposition such that said terminal module and its user interface means are oriented for unobstructed viewing by the user holding said unitaty hand-held device and said scanner module is simultaneously oriented for said scanning operation, and said data source scanner module means being removable as a unit from said terminal module.

63. In a data capture system according to claim 62, a modular handle detachably secured to said data terminal such that a user, grasping said handle supports the data terminal in said normal user disposition with the user interface means directed upwardly so as to be conveniently accessible to the user.

64. In a data capture system according to claim 63, wherein said modular handle is attachable to said data terminal so that the user grasping said modular handle supports said data terminal in said normal user disposition, wherein said user interface means lies in a horizontal plane and is directed upwardly for convenient user interaction and said code scanner module means is simultaneously directed generally forwardly and downwardly.

65. In a data capture system according to claim 64, said scanner module means having a scanner window, and light source means for directing light energy through said scanner window so as to substantially instantaneously read a complete code symbol while said user interface means remains essentially stationary in said normal user disposition.

66. In a data capture system according to claim 62, said data terminal being of a configuration so as to be palm supported with one hand in said normal user disposition, said data terminal having manually actuated triggers at opposite lateral sides thereof such that said scanner module means is readily triggered to effect a code scanning operation by either a right or left hand of the user the palm of whom is disposed in supporting relation to said data terminal.

67. In a data capture system, a data terminal of size and weight to be held in one hand during use, said data terminal comprising a terminal module having a frontal side providing user interface means accommodating user interaction with said data terminal, said terminal module having an underside opposite said frontal side, and accommodating modular attachment therewith, and code scanning module means having manually actuated trigger means and being operable in response to manual actuation of said trigger means to effect an instantaneous reading of a complete code symbol, said code scanning module means comprising a separately enclosed unit with an upper side in mating engagement with said underside of said terminal module, said scanning module means being removable as a unit from said terminal module, said code scanning module means and said terminal module in said mating engagement with each other are arranged to be held in one hand of a user in a normal user position, wherein said terminal module is directly viewable to the user to present said interface means for facile manipulation by the other hand of the user and to permit the user to orient both said mated terminal module and code scanner module means to effect an instantaneous reading of the code symbol by said scanning module means.

68. In a data capture system according to claim 67, a modular handle detachably secured to said data terminal such that a user grasping said handle supports said data terminal in said normal user position, wherein said user interface means is directed upwardly so as to be conveniently accessible to the user.

69. In a data capture system according to claim 68, said data terminal being constructed so that when the user holds said matingly engaged scanning module means and said terminal module in said normal use position, the user interface means lies in a horizontal plane and is directed upwardly, and said code scanner module means is directed generally forwardly and downwardly.

70. In a data capture system according to claim 68, said code scanner module means having a scanner window, and light source means for directing light energy through said scanner window so as to substantially instantaneously read a complete code symbol while said user interface means remains essentially stationary in a horizontal plane and accessible to convenient user interaction.

71. In a data capture system according to claim 66, said data terminal being of configuration so as to be palm supported with one hand, said data terminal having manually actuated triggers at opposite lateral sides thereof such that said bar code scanner module means is readily triggered to effect a bar code scanning operation by either a right or left hand of the user the palm of whom is disposed in supporting relation to said data terminal.

72. In a data capture system, a hand-held portable data terminal of a size and weight to be held within only one hand of a user, said data terminal comprising:
 a) data entry means for receiving and converting data into signals of a selected one of a plurality of signal standards;
 b) control means connectable with said data entry means for controlling the data capture operations of said data terminal;
 c) portable power supply means for powering said data terminal; and
 d) a housing comprising a plurality of integratable modules, and conductor means for receiving and transmitting electrical signals of a given signal standard between each of said plurality of modules and said data terminal, selected of said plurality of modules receiving selected of said means (a)-(c) and comprising means for converting said electrical signals of said selected one signal standard to said electrical signals of said given standard to permit one module to be replaced by a like or different module in an integrated fashion within said housing.

73. In a data capture system of claim 72, wherein said housing is of fixed dimensions, each of said plurality of modules being selectively displaceable from and replaceable in an integrated fashion with said housing without changing said fixed dimensions.

74. In a data capturing system of claim 72, wherein said data entry means comprises user interface means for permitting the user to interact with said data terminal.

75. In a data capturing system of claim 74, wherein said data entry means further comprises data transducing means for capturing and transducing data into signals.

76. In a data capturing system of claim 75, wherein at least one of said plurality of modules comprises said data transducing means and wireless communication means connectable with said control means for providing said data signals to a remote host.

77. In a data capture system of claim 72, wherein said signal processing means includes coupling means which permits one module to be recoupled to said data terminal by a like or different module.

78. In a data capture system of claim 72, wherein said signal processing means standardizes the signals passing through said signal processing means between said one module and said data terminal.

79. In a data capture system of claim 72, wherein there is further included a dummy module, which is constructed to replace one of said plurality of modules in an integrated fashion within said housing.

80. In a data capture system of claim 72, wherein said signal processing means standardizes said electrical signals passing from said interface means of one of said plurality of modules and said conductor means.

81. In a data capture system of claim 72, wherein said conductor means receives and transmits said electrical signals between said interface means and selected of said plurality of modules.

82. In a data capture system of claim 72, wherein said electrical signals are of a plurality of standardized logic levels, selected of said plurality of modules developing electrical signals of varying logic levels differing from said standardized logic levels, said signal processing means of each of said selected modules standardizing said module electrical signals outputted therefrom to said standardized logic levels.

83. In a data capture system, a hand-held portable data terminal of a size and weight to be held in only one hand of a user, said data terminal comprising:
 a) first and second modules, each of said first and second modules comprising opposing front and rear sides;
 b) user interface means disposed at said front side of said first module for permitting the user to interact with said data terminal, whereby said first module has a balance when held by itself done by the user;
 c) bar code scanner means for directing radiation on and reading reflected radiation from a complete code symbol without movement of the code symbol and said scanner means; and
 d) said second module constructed to receive said scanner means and being selectively disposed in a separated state and a connected state wherein said rear side of said first module is connected to said front side of said second module in a manner to maintain said balance of said first module.

84. In a data capture system according to claim 83, wherein said hand-held data terminal has a normal user operating orientation during user interaction with said user interface means, said user interface means generally facing toward the user, and said hand-held data terminal having a normal reading disposition during a reading operation of said scanner means which essentially corresponds with said normal user operating orientation so as to accommodate rapid transitions between reading operation of said scanner means and user interaction with said user interface means without requiring radical changes in the manually held disposition of said data terminal.

85. In a data capture system according to claim 83, wherein said first and second modules forms respectively first and second longitudinally extended layers separated at a juncture plane, said user interface means being in said first longitudinally extended layer at an upper side of said juncture plane in a normal user operating orientation of said user interface means, and said scanner means being directed generally forwardly and away from the user in said normal user operating orientation so as to be essentially in a normal scanning disposition.

86. In a data capture system according to claim 83, said second module having a handgrip portion for manual support thereof and for use in manually directing said scanner means into registry with said code symbol to be read during a data scanning operation of said scanner means.

87. In a data capture system according to claim 83, wherein there is included a third module, said second module extends longitudinally in a first layer and having a length generally comparable to the overall length of said data terminal, and first and third modules extending longitudinal and having aligned longitudinal axes, said first and third modules lying generally in a second layer adjoining said second module along a juncture plane which is located between said second module, and said first and third modules.

88. In a data capture system according to claim 87, wherein said second module forms a platform for support of said first and third modules along said juncture plane.

89. In a data capture system according to claim 87, wherein said first and third terminal modules have said user interface means and a wireless communication unit as operative parts thereof such that said first and third terminal modules are operative entirely separate from said second module as a data terminal unit capable of wireless communication with a remote host.

90. In a data collection system according to claim 83, wherein said data terminal has a normal user operating orientation, said user interface means comprising a keyboard for disposition proximal to the user and a display disposed remotely from the user when said data terminal is disposed in said normal user operating orientation, said scanner means disposed remotely from the user when said data terminal is disposed in said normal user operating orientation.

91. In a data capture system, a hand-held portable data terminal of a size and weight to be held within only one hand of a user, said data terminal comprising:
 a) user interface means for permitting the user to interact with said data terminal;
 b) data transducing means for reading code data and transducing it into signals;
 c) control means connectable to said user interface means and said data transducing means for controlling the data capture operations of said data terminal;
 d) portable power supply means for powering said data terminal; and
 e) a housing of a given configuration comprising a plurality of discrete exterior surfaces integratable with each other to define a composite exterior surface, and a plurality of integratable modules, each of said plurality of modules having a module casing for enclosing selected of said means (a)–(d), each module casing comprising at least one of said plurality of discrete exterior surfaces, each of said plurality of modules being selectively disconnected from and connected to said data terminal whereby said discrete exterior surfaces of said connected modules form said composite exterior surface, said housing having a hand grip portion to be gripped by a user to orient said data terminal in a normal user operating position, a selected one of said plurality of modules for receiving said data transducing means and oriented when connected to said data terminal to read the code data disposed remote from the user.

92. In a data capturing system of claim 91, wherein there is further included wireless communication means connectable with said control means for providing said data signals to a remote host, selected of said plurality of modules receiving said wireless communication means.

93. In a data capturing system of claim 92, wherein said selected module or modules includes antenna means connected with said wireless communication means therein.

94. In a data capturing system of claim 93, wherein said antenna means is confined within said given configuration of said housing.

95. In a data capturing system of claim 93, wherein each of said selected modules or module has an exterior portion which comprises an exterior portion of said housing when said selected modules or module is replaced within said housing, said antenna means being embedded within said exterior portion of said corresponding module.

96. In a data capture system according to claim 91, wherein said housing has manually actuated selector means in proximity to said hand grip portion for manual actuation by the user's hand supporting said hand grip portion so as to control the reading of the code symbol.

97. In a data capture system according to claim 91, wherein said user interface means comprises a keyboard for disposition proximal to the user and a display for disposition remote from the user when said data terminal is held in its normal user operating orientation, said scanner means being disposed remotely with respect to said display remote from the user when said data terminal is held in its normal user operating orientation.

98. In a data capture system according to claim 91, wherein said data terminal has manually actuated triggers disposed at opposite lateral sides of said hand grip portion such that said bar code scanner module means is readily triggered to effect the code scanning operation by either a right or left hand of the user, the palm of which is disposed in supporting relation to said data terminal.

99. In a data capture system according to claim 91, wherein when said data terminal is supported in said normal user operating orientation, said user interface means lies in a horizontal plane and is directed upwardly for convenient user interaction and said scanner means is simultaneously directed generally forwardly and downwardly; said hand grip portion being arranged so that when said data terminal is disposed in its normal user operating orientation said bar code scanner means is simultaneously oriented to effect a reading of said bar code symbol.

100. In a data capture system according to claim 91, wherein said housing has a hand grip portion so arranged such that a user grasping said hand grip portion supports said data terminal in a normal user operating orientation wherein said user interface means is directed upward so as to be conveniently accessible to the user.

101. In a data capture system of claim 91, wherein said plurality of modules includes a first module disposed within a first layer and a second module disposed in a second layer adjoining said first layer along a juncture plane which is disposed between said first and second modules.

102. In a data capture system of claim 101, wherein said first module contains said user interface means and said second module contains said data transducing means.

103. In a data capture system of claim 102, wherein said plurality of modules includes a third module disposed in said second layer and having an axis aligned with that of said second module.

104. In a data capture system of claim 103, wherein said third module contains said control means.

105. In a data capture system of claim 104, wherein, said second module contains wireless communications means and is connectable with said control means, and there is included connector means for coupling signals between said control means and said wireless communication means and for standardizing the logic levels of the coupled signals such that said second module is removable and replaceable without requiring tuning adjustments.

106. In a data capture system of claim 103, wherein said third module contains said portable power supply.

107. In a data capture system of claim 106, wherein there is further included connector means for coupling power from said portable power supply to each of said first and second modules.

108. In a data capture system of claim 102, wherein said second module contains wireless communications means connectable with said control means for providing said data signal to a remote host.

109. In a data capture system of claim 101, wherein said first module contains said user interface means and said second module contains wireless communications means connectable with said control means for providing said data signal to a remote host.

110. In a data capture system of claim 101, wherein said first module contains said user interface means and said portable power supply means.

111. In a data capture system of claim 91, wherein said housing has opposing first and second surfaces, said second surface has a hand grip portion for receiving a first hand of the user, said user interface means comprises a keyboard disposed in said first surface for ready actuation by the second hand of the user and disposed immediately above said hand grip portion to provide data terminal support during keyboard actuation.

112. In a data capture system of claim 111, wherein the user grasps said hand grip portion to support said data terminal in a normal user operating orientation, said second surface has a downwardly protruding shoulder disposed at a side of said hand grip portion remote from the user when said data terminal is disposed in its normal user operating orientation.

113. In a data capture system,
a data terminal of a size and weight to be held in one hand in a normal user operating orientation, having a frontal side providing user interface means accommodating user interaction with said data terminal,
said data terminal comprising a terminal module providing said user interface means at said frontal side of said data terminal and having an underside opposite said frontal side, and accommodating modular attachment therewith, and
a removable and replaceable code reader module for directing radiation on and reading reflected radiation from a complete code symbol without relative movement of the code symbol and said code reader module, and having an upper side in mating engagement with said underside of said data terminal to form a unitary hand-held data capture device, with means for transmitting code data from said code reader module to said data terminal,
said code reader module being removable as a unit from said terminal module, and
a handle secured to said data terminal such that a user grasping said handle supports said data terminal with said user interface means oriented for unobstructed viewing and convenient interaction by the user and said reader module is simultaneously oriented for reading the code symbol.

114. In a data capture system according to claim 113, said data terminal being constructed so that when said data terminal is held by a user in its normal user orientation, said user interface means lies in a horizontal plane and is directed upwardly to be readily accessible to the user, and said code scanner module is directed generally forwardly from the user and downwardly.

115. In a data capture system according to claim 114, said code scanner module having a scanner window, and light source means for directing the radiation in the form of light energy through said scanner window so as to substantially instantaneously read a complete code symbol while said user interface means remains essentially stationary in a horizontal place and accessible to convenient user interaction.

116. In a data capture system,
a data terminal of size and weight to be held in one hand in a normal user operating orientation, said data terminal comprising a terminal module providing a frontal side providing user interface means accommodating user interaction with said data terminal and an underside opposite said frontal side and accommodating modular attachment therewith,
a code reader module for reading data code indicia and converting it to data signals and having an upper surface for engagement with said underside of said data terminal module, whereby said terminal module may be separated from said code reader and said data terminal independently operated, and
a handle secured to said code reader such that a user grasping said handle supports said data terminal with the user interface means oriented for convenient interaction by the user and said code reader module is simultaneously oriented for reading the data code indicia.

117. In a data capture system according to claim 116, wherein there is releasable means for applying said data signals to said data terminal.

118. In a data capture system according to claim 116, wherein said handle is constructed to receive portable power supply means.

119. In a data capture system according to claim 118, wherein there is included means for connecting said portable supply means to energize said code reader module.

120. In a data capture system according to claim 118, wherein there is included releasable means for connecting said portable supply means to energize said code reader module.

121. In a data capture system, a hand-held portable data terminal capable of operator adaptation from a first configuration to an augmented configuration, said data terminal comprising:
a) data entry means for receiving and converting data into electrical signals;

b) control means connectable to said data entry means for controlling the data capture operations of said data terminal;

c) portable power supply means for powering said data terminal;

d) a housing comprising a plurality of discrete exterior surfaces integratable with each other to form a composite exterior surface about said data terminal;

e) a plurality of modules including in said initial configuration a dummy module, each of the remaining of said plurality of modules for receiving selectively said means (a)–(c) and including an interface means to permit one of said plurality of modules to be replaced by a like or different module, each of said plurality of modules has an enclosed module casing, each module casing comprising at least one of said plurality of discrete exterior surfaces, each of said plurality of modules being selectively withdrawn from or incorporated in an integrated fashion within said housing whereby said discrete exterior surfaces of said incorporated modules form said composite exterior surface;

f) means for performing an augmented function; and g) said plurality of modules further including an augmented module for containing said augmented means, said augmented module adapted to replace said dummy module whereby said data terminal is disposed to its augmented configuration.

122. In a data capture system of claim 121, wherein said augmented means comprises wireless communication means for transmitting and receiving signals from a remote source.

123. In a data capture system of claim 121, wherein said augmented means comprises bar code scanning means for directing radiation on and reading reflected radiation from a bar code symbol.

124. In a data capture system of claim 123, wherein said housing comprises a hand grip portion disposed to be gripped manually by the operator in a normal position, wherein said data entry means is disposed upwardly to be readily viewed by the operator and said augmented module is disposed so that said bar code reader is oriented to read a bar code disposed remotely from the operator.

125. In a data capture system of claim 121, wherein said control means comprises a primary memory, said augmented means comprises an expanded memory.

126. In a data capture system, a hand-held data terminal of a size and weight to be held in one hand during use and having a frontal side, said data terminal comprising (a) user interface means providing for user interaction with said data terminal, (b) a terminal module orienting said user interface at said frontal side of said data terminal and having an underside opposite said frontal side, said underside accommodating modular attachment therewith, (c) data transducing means for transducing data signals in the furtherance of data capture operations, (d) control means operatively interconnected with said user interface means and with said data transducing means for controlling data capture operations of said data terminal, (e) portable power supply means for powering said data terminal, and (f) a transducer module receiving said data transducer means and constructed for removable attachment from said underside of said terminal module.

127. In a data capture system according to claim 126, said data transducing means comprising a full image reader unit, said hand-held data terminal having a normal user operating orientation to facilitate user interaction with said user interface means, wherein said user interface means generally faces toward the user and said full image reader unit is disposed to effect a reading operation without requiring substantial changes in said normal user operating orientation of said data terminal.

128. In a data capture system according to claim 127, a modular handle detachably secured to said underside of said data terminal, said modular handle having an axis which traverses said underside of said data terminal when said modular handle is secured thereto.

129. In a data capture system according to claim 128, said modular handle having a manually actuable trigger and means removably engagable with said terminal module for causing said image reader unit to effect a code reading operation when said trigger is activated.

130. In a data capture system according to claim 126, said data transducing means comprising a wireless communication unit.

131. In a data capture system according to claim 126, said data transducing means comprising a full image reader unit and a wireless communication unit, a common transducer housing containing said full image reader unit and said wireless communication unit, said common transducer housing being readily detachable from said underside of said terminal module.

132. In a data capture system according to claim 126, wherein said transducer module has at least one trigger, said trigger being manually actuated to effect a code scanning operation thereby.

133. In a data capture system according to claim 126, said terminal module having a compartment therein for receiving said power supply means, said compartment having an opening to said underside, and a cover mounted to be moved between an open position and a closed position with respect to said opening.

134. In a data capture system, a hand-held portable data terminal of a size and weight to be held within only one hand of a user, said data terminal comprising:

a) data entry means for receiving and converting data into signals;

b) control means connectable with said entry means for controlling the data capture operations of said data terminal;

c) portable power supply means for powering said data terminal; and d) a housing of a given configuration comprising a plurality of integratable modules, selected of said plurality of modules receiving selected of said means (a)–(c) in an integrated fashion within said given configuration of said housing, at least one of said plurality of modules comprises memory means adapted to be connected to said control means when said one module is replaced within said housing.

135. In a data capturing system of claim 134, wherein said control means comprises second memory means and said first mentioned memory means augments the storage capacity of said second memory means.

* * * * *